(12) United States Patent
Dalli et al.

(10) Patent No.: US 12,367,407 B2
(45) Date of Patent: Jul. 22, 2025

(54) BEHAVIORAL PREDICTION AND BOUNDARY SETTINGS, CONTROL AND SAFETY ASSURANCE OF ML AND AI SYSTEMS

(71) Applicant: UMNAI Limited, Ta'Xbiex (MT)

(72) Inventors: Angelo Dalli, Floriana (MT); Matthew Grech, San Gwann (MT); Mauro Pirrone, Kalkara (MT)

(73) Assignee: UMNAI LIMITED, Ta' Xbiex (MT)

( * ) Notice: Subject to any disclaimer, the term of this patent is extended or adjusted under 35 U.S.C. 154(b) by 276 days.

(21) Appl. No.: 17/943,722

(22) Filed: Sep. 13, 2022

(65) Prior Publication Data

US 2023/0004846 A1    Jan. 5, 2023

Related U.S. Application Data

(63) Continuation of application No. 17/525,602, filed on Nov. 12, 2021, now Pat. No. 11,468,350.

(60) Provisional application No. 63/113,445, filed on Nov. 13, 2020.

(51) Int. Cl.
*G06N 5/045* (2023.01)
*G06N 5/048* (2023.01)
*G06N 20/00* (2019.01)

(52) U.S. Cl.
CPC ............. *G06N 5/045* (2013.01); *G06N 5/048* (2013.01); *G06N 20/00* (2019.01)

(58) Field of Classification Search
None
See application file for complete search history.

(56) References Cited

PUBLICATIONS

Puiutta, Erika, and Eric MSP Veith. "Explainable reinforcement learning: A survey." In International cross-domain conference for machine learning and knowledge extraction, pp. 77-95. Cham: Springer International Publishing, 2020. (Year: 2020).*
Goebel R., Chander A., Holzinger K., Lecue F., Akata Z., Stumpf S., Kieseberg P., Holzinger A. Explainable AI: The New 42? in International cross-domain conference for machine learning and knowledge extraction Aug. 27, 2018 (pp. 295-303). Springer, Cham. (Year: 2018); 9 pages.

(Continued)

*Primary Examiner* — Vincent Gonzales
(74) *Attorney, Agent, or Firm* — Maier & Maier, PLLC

(57) ABSTRACT

Typical autonomous systems implement black-box models for tasks such as motion detection and triaging failure events, and as a result are unable to provide an explanation for its input features. An explainable framework may utilize one or more explainable white-box architectures. Explainable models allow for a new set of capabilities in industrial, commercial, and non-commercial applications, such as behavioral prediction and boundary settings, and therefore may provide additional safety mechanisms to be a part of the control loop of automated machinery, apparatus, and systems. An embodiment may provide a practical solution for the safe operation of automated machinery and systems based on the anticipation and prediction of consequences. The ability to guarantee a safe mode of operation in an autonomous system which may include machinery and robots which interact with human beings is a major unresolved problem which may be solved by an exemplary explainable framework.

20 Claims, 18 Drawing Sheets

(56) References Cited

PUBLICATIONS

Glomsrud J. A., Odegardstuen A, Clair A. L., Smogeli O. Trustworthy versus explainable AI in Autonomous Vessels. In Proceedings of the International Seminar on Safety and Security of Autonomous Vessels (ISSAV) and European STAMP Workshop and Conference (ESWC) 2019 (pp. 37-47). (Year: 2019); 12 pages.
Peteiro-Barral D, Guijarro-Berdiñas B. A survey of methods for distributed machine learning. Mar. 1, 2013 ;2(1):1-1. (Year: 2013); 11 pages.
S. Russell and P. Norvig, Artificial Intelligence: A Modern Approach, 2nd Ed., 2003, Chapter. 2-17, pp. 59-645. (Year: 2003); 605 pages.
Preece A, Braines D, Cerutti F, Pham T. Explainable AI for Intelligence Augmentation in Multi-Domain Operations. arXiv preprint arXiv:1910.07563. Oct. 1, 20196. (Year: 2019); 7 pages.

\* cited by examiner

BEHAVIORAL PREDICTION AND BOUNDARY SETTINGS, CONTROL AND SAFETY ASSURANCE OF ML AND AI SYSTEMS

CROSS-REFERENCE TO RELATED APPLICATIONS

This application claims priority from U.S. patent application Ser. No. 17/525,602, filed Nov. 12, 2021, entitled "BEHAVIORAL PREDICTION AND BOUNDARY SETTINGS, CONTROL AND SAFETY ASSURANCE OF ML & AI SYSTEMS," which claims priority from U.S. Provisional Patent Application No. 63/113,445, filed on Nov. 13, 2020, the entire contents of which are hereby incorporated by reference.

FIELD

An exemplary embodiment relates to the field of machine learning and artificial intelligence systems.

BACKGROUND

Systems based on machine learning, such as autonomous systems and semi-autonomous systems, may provide a beneficial decision-making process. In a typical autonomous system, decisions that are usually taken by a human being are taken by the system itself. In a semi-autonomous system, decisions that are usually taken by a human being are taken by the system, but the human beings can monitor the system and override decisions.

Referring to the embodiment of the prior art illustrated in FIG. 1, Zhou (2018) utilizes machine learning algorithms to construct models for triaging failure events of autonomous vehicle systems. Zhou (2018) extracts features 110 from vehicle data logs 100, where the vehicle data logs 100 are generated by an autonomous vehicle system. The extracted features are used as input to machine learning classifier models 120, to classify the type of failure 130 for the corresponding failure event, using the respective objective function 140. The features used in the machine learning classifier models may include the velocity, positioning, acceleration, and stopping power of the autonomous vehicle. The trained machine learning classifier models may assist in vehicle system failure events based on the features selected for the models.

Haynes et al. (2019) proposes an autonomous system that uses machine learning models to detect static objects, where objects that are unlikely to move in the near future are classified. The machine learning classification model (Haynes et al., 2019) may be trained using features processed from the sensor data and objects that are not detected as static are passed to additional machine learning models, such as a ballistics motion model, to determine their trajectory prediction using traditional machine learning algorithms such as decision-tree based models and neural network. The data retrieved from the sensors may include the location of the nearby objects, such as traffic signals, additional vehicles, and pedestrians. The autonomous system proposed by Haynes et al. (2019) may determine a motion plan for the vehicle using the predicted values from the machine learning models. The motion plan may be used to control the motion of the autonomous vehicle.

Machine learning based systems may face challenges when it comes to autonomous and semi-autonomous systems. Autonomous and semi-autonomous systems were the cause of fatal accidents such as the Tesla autopilot incident in May 2016 and the Uber incident in March 2018. These incidents highlight the challenges regarding the safety of artificial intelligence in autonomous and semi-autonomous systems. Methodologies are required to assure the safety of machine learning systems in order to take the necessary actions and avoid fatal incidents.

Referring now to FIG. 2, FIG. 2 may illustrate the process flow regarding the behavior of autonomous and semi-autonomous systems. The abstract process flow of an autonomous system may consist of design errors 310, which may affect the intended behavior 300 of the autonomous or semi-autonomous system and hence alter the actual outcome 320 of the autonomous or semi-autonomous system. Errors in the design of a system 310 may include the lack of critical real-time actions, based on the predictions generated by a machine learning model, such as the lack of timely activation of the emergency brake in a self-driving car system, in a situation that could lead to a fatal accident or similar impactful accident or event. In a semi-autonomous system, a human operator receives the actual behavior continuously 350 in order to understand the behavior of the system 340. The documentation of the system 330 may also provide an understanding of the behavior of the system 340. The human operator may observe the behavior of the system 350 and the actual design of the system 300, in order to make the necessary decisions in response 360 to the actual behavior of the system and in certain cases may override the decisions made by the semi-autonomous system.

Watchkeeper is an Unmanned Air System (UAS) utilized by the UK army, consisting of a semi-autonomous system operated by human operators at the Ground Control Station (GCS) which was the initial subject of McDermid et al. (2019). Watchkeeper has experienced five accidents to date which were caused by an incomplete understanding of the integration of sub-systems of the semi-autonomous system.

The safety framework proposed by McDermid et al. (2019), as shown in FIG. 3, illustrates the gaps of the safety and assurance in an autonomous system that utilize machine learning models for decision making. This framework describes safety gaps that are created due to the involvement of machine learning in an autonomous system, where traditional safety principles would not apply to these gaps.

The framework proposed by McDermid et al. (2019) may include four main components: the real world 400, the world as imagined 420, the safety and assurance policies 440 and the world as observed 450. The real world refers to the environment of the operation of the system when it is deployed. The world as imagined 420 may refer to the modelling 425 of the system based on the perception of the real-world environment by the designers of the system. Hence, the safety analysis 430 of the world as imagined 420 may be limited to the design precautions that were implemented by the designers. The world as observed 450 may refer to the data produced in real-time by the system, such as images from sensors and prediction output from machine learning algorithms. Safety and assurance 440 cases may be initially based on the world as imagined, however may be constantly updated by the world as observed to reflect the safety measures on the real-world environment 405.

The framework (McDermid et al., 2019) may be deployed in operation in order to continuously update each state to minimize the gap between the world as imagined 420 and the world as observed 450. The gap may be minimized by reducing the possibility that the autonomous system would not function as intended. FIG. 3 may illustrate an exemplary framework as known in the prior art. The framework includes four main components: the real world 400, the world as imagined 420, the safety and assurance policies 440 and the world as observed 450. The real world 400 refers to the environment 405 that the autonomous system 410 is operating in. The world as imagined 420 refers to the modelling 425 of the system and the safety analysis 430 based on these models.

The world as observed 450 refers to the data produced in real-time by the system, such as images from sensors and prediction output from machine learning algorithms, including the model used at runtime and the runtime data 455 and the ML analysis 460. The Safety and Assurance 440 policies are initially based on the world as imagined 420; however, such policies are constantly updated by the world as observed 450 to reflect the safety measures on the real-world environment 405.

The framework proposed by McDermid et al. (2019) shows the gaps in the safety and assurance measures that typical machine learning models face in an autonomous system. The gap between the real world 400 and world as imagined 420 illustrates the assumptions that the data analysts usually make during the construction of the machine learning models. Assumptions may include statistical assumptions, features selected for training data, and distribution of the training data. The statistical assumptions in the world as imagined 420 may not apply to the world as observed 450. The features selected to build a machine learning model may not be available in the world as observed 450 and hence an autonomous system may end up with observations 455 with too few features that are insufficient to generalize a prediction output correctly for decision making.

This framework highlights the gaps between the performance of the design and simulation of system components designed for an imagined environment with the performance on the observed environment. The gap between real world and world as imagined highlights the assumptions the data analysts make during the construction of the machine learning models. These assumptions may include statistical assumptions, features selected for training data, and distribution of the training data. Statistical assumptions in the world as imagined may not apply to the world as observed.

The gap between the real world 400 and the world as observed 450 may include sensor limitations with respect to the environmental conditions, limitations of the machine learning algorithms such as false positives and false negative observations and the limitations of human cognitive ability in semi-autonomous systems to respond to the output of the system.

The safety analysis 430 is based on hypothetical assumptions and the human understanding of the real-world environment 405. However, some autonomous systems that are based on machine learning algorithms may be rich in data generation. Data allows the understanding of the influence of the features regarding safe behavior and therefore may provide explainability on the features. The influence of the features, or feature importance, can allow for the construction of rules to limit certain behaviors of the autonomous system to stay within certain safe boundaries.

In order to achieve safety in critical scenarios such as in autonomous systems where certain tasks may be fatal to a human being, assurance may be required at each step of the machine learning life cycle. Ashmore et al. (2019) illustrates four stages, or machine learning components, of a machine learning model lifecycle, where each stage should be analyzed for safety and assurance, namely: data management, model learning, model verification and model deployment.

The data management stage may include dataset collection, required for the training and validation of the machine learning model, and data pre-processing and feature engineering to create an optimal model. This stage produces the training dataset and the validation dataset. Collected data needs to be relevant to ensure system safety. In an exemplary embodiment, in an autonomous vehicle application, Chinese road signs would not be relevant when operating in Germany (and vice-versa). Ashmore also recommend that data exhibit the following properties: balanced sampled data for each class; domain suitability for the task being solved across the input space; data completeness; and data accuracy.

The model learning stage may include the selection of the machine learning algorithm in order to train the model using hyperparameter tuning techniques, validation dataset and cross-validation techniques to avoid overfitting the model on an unseen dataset, and other relevant techniques. Model parameters may be tuned to reduce generalization error while reflecting the objective function of the task. Complex models may require a considerable amount of time to train and may use transfer learning to transfer domain knowledge from one ML model to another ML model. In this work, explainable models may be initialized by transferring knowledge from a black-box model, or by transferring knowledge from an existing ruleset, which has been trained externally, or directly from a human supplied ruleset. Transfer learning may improve the speed and quality of the resulting explainable model. The resulting performance of the ML model (as determined by suitable performance metrics) also ensures the safety of the model learning component. Robustness, behavior in face of previously unforeseen data and out-of-distribution (OOD) data, and re-usability are also main factors that affect safety.

The model verification stage ensures that the performance of the trained model is consistent on unseen data, including testing on new data, running verification tests for the validation dataset, performance testing, formal verification, and other suitable tests. Detected errors that violate expected test criteria pre-established by the safety tests, may raise a flag for further refinement of the model, which may return the process all the way back to the data management stage.

The model deployment stage may include integration of the trained and verified model in a deployed system. Runtime checks, such as input data checks, environmental monitoring, and monitoring of the internal computation state of the ML model may be needed to ensure safety in case an abnormal event modifies a safety condition of the model in a critical situation.

A model of a computation that includes a set of states and transition functions between states is known as a finite state machine (FSM). An FSM may include the start state where the computation begins and may then transition to other defined states according to the transition function. An FSM may be represented by a 5-tuple vector as defined in equation 1.

$$<Q, \Sigma, \delta, q_0, \mu> \quad (1)$$

Q represents a set of states, $\Sigma$ is a set of finite symbols that the FSM accepts in the model, $\delta$ represents the transition function, $q_0$ is the start state and $\mu$ represents the final states of the model, where $\mu \subseteq Q$.

An FSM with probabilities for each transition between states is called a Markov chain. These probabilities are known as transition probabilities. A Markov chain is a discrete-time stochastic process that makes use of the Markov property with a set of states Q. The Markov property is defined where each future state $s_f$, where $s_f \in Q$, is conditionally independent of the prior state given the current state. Conditional independence may be defined given two states $u_1$ and $u_2$ that are conditionally independent of an event g. The states $u_1$ and $u_2$ are independent events in their conditional probability given g, as shown in equation 2.

$$P(u_1 \cap u_2|g) = P(u_1|g)P(u_2|g) \quad (2)$$

A variant of the Markov chain where the current state is not observable is a Hidden Markov Model (HMM). An HMM, defined as shown in equation 3, generates the probabilities B, where each probability value refers to the probability of an observation $o_k$ from a state $q_i$. Q represents a set of states, where $Q=\{q_1, q_2, \ldots, q_N\}$. O represents the sequence of observations, where each observation $o_i$ is drawn from a vocabulary V, where $V=\{v_1, v_2, \ldots, v_n\}$. A represents the transition probability matrix, where the probability refers to moving, for example, from the current state $q_i$ to the next state $q_1$. $\Pi$ refers to the initial probability distribution over the states. An HMM interpret its states, where such states are not directly observable, by analyzing the pattern of a sequence of observed symbols from such states.

$$Q, A, O, B, \Pi > \quad (3)$$

Petri Nets may provide a graphical notation to describe complex systems and processes. Petri Nets may be constructed as directed graphs. Exemplary Petri Nets may include five elements as shown in Equation 4. P may represent a finite set of n places. L may represent a finite set of transitions. EV may represent the flow relation between P and the transitions L. W may represent the weight mapping for EV and $m_o$ may represent the initial representation of P.

$$N = <P, L, EV, W, m_o> \quad (4)$$

Blind spots are critical in autonomous and semi-autonomous system since the input to these models may contain noise that may result in an incorrect prediction and thus, the safety of these systems might not be assured. Adversarial generated observations generate wrong predictions with high confidence (Goodfellow et al., 2014) and highlight blind spots in machine learning algorithms.

Current autonomous and semi-autonomous systems that are fully or partially based on black-box machine learning models to predict information, such as the motion of detected objects, or for the prevention of a component failure in the system, are unable to provide an explanation or justification for the predictions. Subsequently, such current systems are unable to detect the most prominent features, and unable to detect feature bias in an interpretable, evidenced, and auditable manner.

SUMMARY

According to at least one exemplary embodiment, a method, system, and computer program product for a behavioral model for safety and assurance in artificial intelligence (AI) and machine learning based systems may be shown and described.

Machine learning (ML) based autonomous systems that use black-box ML models may be difficult to adjust for safety and assurance in a real-time scenario, as these systems can only adjust sub-components and trigger actions based solely on the prediction output of the ML models. The nature of black-box models does not allow an autonomous system or semi-autonomous system to interpret the model and provide an explanation on how it arrived at the predicted result. This information is critical in autonomous systems. An autonomous system or semi-autonomous system that uses white-box ML models may provide an explanation of the impact of each input feature, and the internal coefficients, on the prediction output.

An exemplary embodiment introduces a behavioral modelling framework BM, as shown in FIG. 4, for the autonomous systems that are based on an explainable white-box model 500 x and/or causal architecture 510. Behavioral modelling framework BM may set conditional boundary constraints $BM_c$, that upon activation, fire events $BM_e$ to activate triggers $BM_t$, where the conditional constraints $BM_c$ are based on the coefficients of internal parts of the explainable white-box model $BM_x$ 500 and/or causal architecture 510. Conditional boundaries $BM_c$ may reduce the gap between the real world 400 and the world as observed 450 by adapting to the current environment of the autonomous system and updating the safety and assurance analysis 440 in real-time.

An exemplary embodiment may process data in real time via white-box models. White-box models can explain the predicted result by backtracking the result to the input feature space and can construct an importance value, known as feature attribution, for each input feature. In an exemplary embodiment, the white-box model may be customizable and hence enabling coefficients inside the white-box model to be modified directly using either human knowledge injection or autonomous system knowledge injection. The customizability of a white-box model may offer increased safety and assurance in the AI based autonomous systems and semi-autonomous systems.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
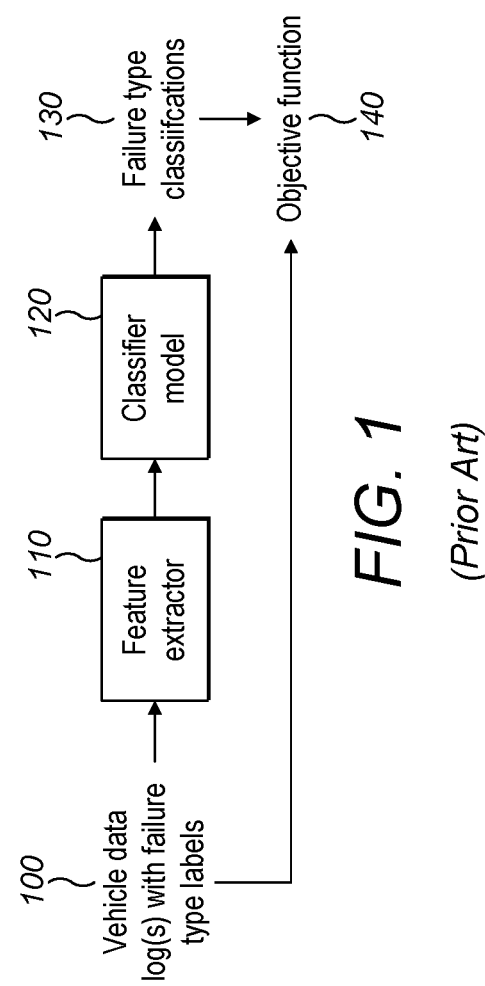
FIG. 1 is an exemplary embodiment of an illustration of the training configuration for failure type classifications as found in the prior art.
Figure 2:
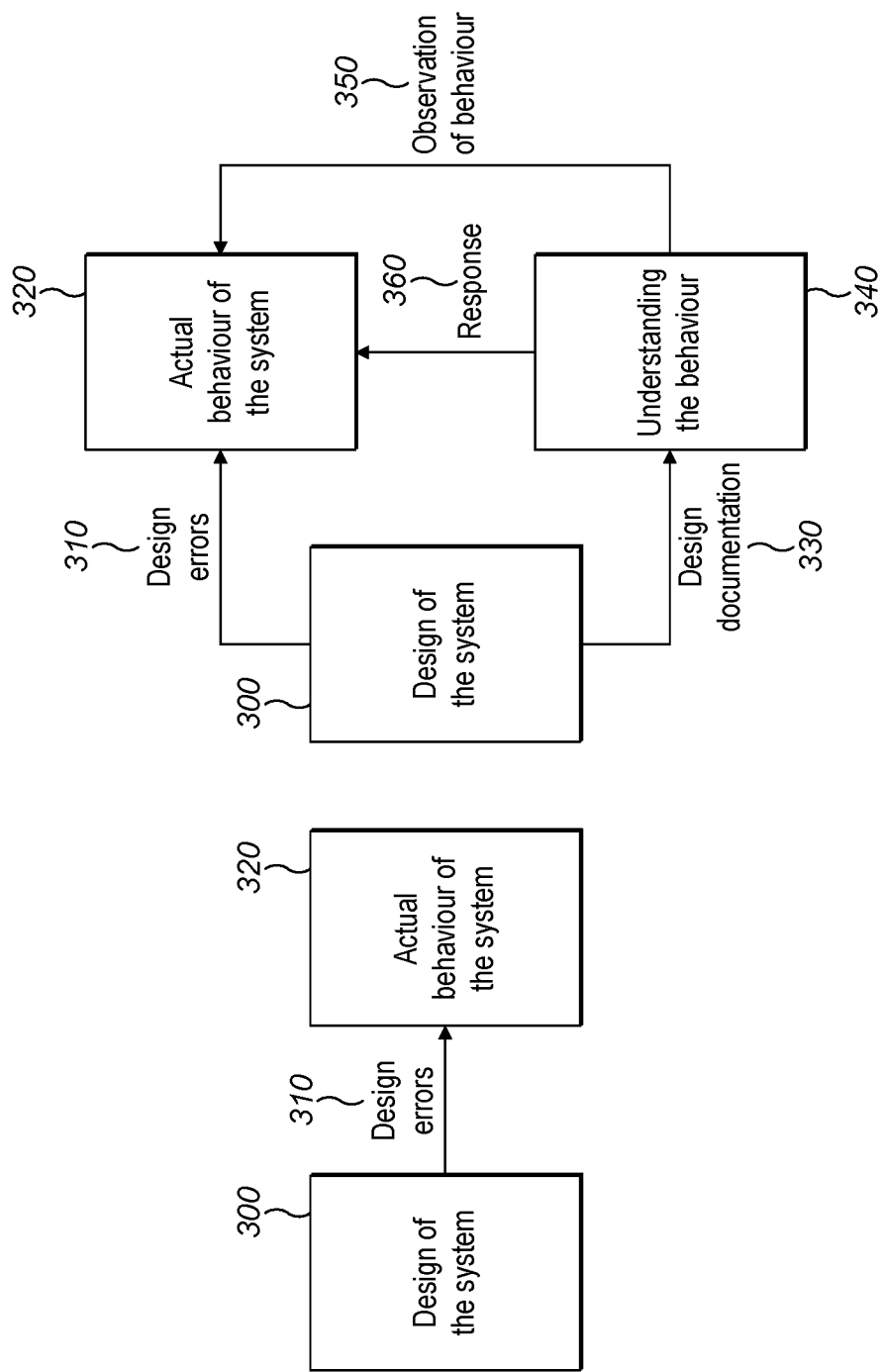
FIG. 2 is an exemplary illustration of the behavior of autonomous and semi-autonomous systems.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequences of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter. In addition, for each of the embodiments described herein, the corresponding form of any such embodiment may be described herein as, for example, "a computer configured to" perform the described action.

The terms interpretable and explainable may have different meanings. Interpretability may be a characteristic that may need to be defined in terms of an interpreter. The interpreter may be an agent that interprets the system output or artifacts using a combination of (i) its own knowledge and beliefs; (ii) goal-action plans; (iii) context; and (iv) the world environment. An exemplary interpreter may be a knowledgeable human.

An alternative to a knowledgeable human interpreter may be a suitable automated system, such as an expert system in a narrow domain, which may be able to interpret outputs or artifacts for a limited range of applications. In an exemplary embodiment, a medical expert system, or some logical equivalent such as an end-to-end machine learning system, may be able to output a valid interpretation of medical results in a specific set of medical application domains.

It may be contemplated that non-human Interpreters may be created in the future that can partially or fully replace the role of a human Interpreter, and/or expand the interpretation capabilities to a wider range of application domains.

There may be two distinct types of interpretability: (i) model interpretability, which measures how interpretable any form of automated or mechanistic model is, together with its sub-components, structure, and behavior; and (ii) output interpretability which measures how interpretable the output from any form of automated or mechanistic model is.

Interpretability thus might not be a simple binary characteristic but can be evaluated on a sliding scale ranging from fully interpretable to un-interpretable. Model interpretability may be the interpretability of the underlying embodiment, implementation, and/or process producing the output, while output interpretability may be the interpretability of the output itself or whatever artifact is being examined.

A machine learning system or suitable alternative embodiment may include a number of model components. Model components may be model interpretable if their internal behavior and functioning can be fully understood and correctly predicted, for a subset of possible inputs, by the interpreter. In an embodiment, the behavior and functioning of a model component can be implemented and represented in various ways, such as a state-transition chart, a process flowchart or process description, a Behavioral Model, or some other suitable method. Model components may be output interpretable if their output can be understood and correctly interpreted, for a subset of possible inputs, by the interpreter.

An exemplary machine learning system or suitable alternative embodiment may be (i) globally interpretable if it is fully model interpretable (i.e., all of its components are model interpretable), or (ii) modular interpretable if it is partially model interpretable (i.e., only some of its components are model interpretable). Furthermore, a machine learning system or suitable alternative embodiment, may be locally interpretable if all its output is output interpretable.

A grey-box, which is a hybrid mix of a black-box with white-box characteristics, may have characteristics of a white-box when it comes to the output, but that of a black-box when it comes to its internal behavior or functioning.

A white-box may be a fully model interpretable and output interpretable system which can achieve both local and global explainability. Thus, a fully white-box system may be completely explainable and fully interpretable in terms of both internal function and output.

A black-box may be output interpretable but not model interpretable, and may achieve limited local explainability, making it the least explainable with little to no explainability capabilities and minimal understanding in terms of internal function. A deep learning neural network may be an output interpretable yet model un-interpretable system.

A grey-box may be a partially model interpretable and output interpretable system and may be partially explainable in terms of internal function and interpretable in terms of output. Thus, an exemplary grey-box may be between a white-box and a black-box on a scale of most explainable and interpretable (white-box) to least explainable and interpretable (black-box). Grey-box systems may have a level of modular interpretability since some of their components may be model interpretable.

An explainable architecture x, where x∈{XAI, XNN, XTT, XRL, XSN, XMN, INN} or logically equivalent or similar architectures, may be integrated in behavioral model BM as part of the structure of an exemplary model. A behavioral model BM may include conditions $BM_c$, events $BM_e$, triggers $BM_t$ and actions $BM_a$ based on attributions and information that is retrieved from internal states of the explainable architectures or from the output of the computation from explainable architectures $BM_x$. The output may include any related meta information of the explainable architectures.

Exemplary embodiments of explainable architectures that may be integrated in the behavioral model BM include, but are not limited to, eXplainable artificial intelligence (XAI) models, Interpretable Neural Nets (INNs), eXplainable Neural Nets (XNN), eXplainable Transducer Transformer (XTT), eXplainable Spiking Nets (XSN) and eXplainable Memory Nets (XMN) models. A further exemplary embodiment may present methods for detecting bias both globally and locally by harnessing the white-box nature of eXplainable Reinforcement Learning (XRL).

Although some examples may reference one or more of these specifically (for example, only XAI or XNN), it may be contemplated that any of the embodiments described herein may be applied to XAIs, XNNs, XTTs, XSNs, or XMNs interchangeably. Another exemplary embodiment may relate to bias detection in Interpretable Neural Networks (INNs) and related grey-box models, which may be a hybrid mix between a black-box and white-box model. An exemplary embodiment may apply fully to the white-box part of the grey-box model and may apply to at least some portion of the black-box part of the grey-box model. It may be contemplated that any of the embodiments described herein may also be applied to INNs interchangeably.

Exemplary embodiments may also be implemented entirely in hardware using a dedicated fixed hardware circuit such as digital electronic circuitry, analog circuitry, a digital-analog hybrid, integrated circuitry, application specific integrated circuits (ASICs), field programmable gate arrays (FPGAs), neuromorphic circuits, optical circuits, optical-electronic hybrid, and quantum computing hardware. Mixtures of dedicated hardware and software and more general CPU based solutions may be contemplated.

XNNs are a new type of Artificial Neural Networks (ANNs) that are inherently interpretable and explainable. The main concept behind an XNN is that the inner network structure is fully interpretable. Interpretability is built within the architecture itself, yet it functions like a standard neural network. This eliminates the need to apply additional techniques or processing for interpreting the result of a neural network. XNNs compute both the answer and its explanation in a single feed-forward step without any need for simulations, iterations, perturbation, etc. XNNs are also designed to be easily implementable both in software but also in hardware efficiently, leading to substantial speed and space improvements.

The architecture behind an XNN may combine multiple local models into one global model. Local models may analyze a small area within the entire search space. In an exemplary embodiment, when a transaction is analyzed in a local manner, a linear model may sufficiently explain the model. On the other hand, global models may provide an understanding of the model with a holistic view. XNNs may merge the two; multiple partitions may represent the local zones and multiple linear models may explain each partition, which are combined to create a global model. Additionally, XNNs may be designed to cater for non-linear data by embedding transformations within the neural network itself, while still retaining explainability. Each layer, neuron, and connection within an XNN has a precise and well known and understandable function, unlike a standard ANN which is a black-box. XNNs may give rise to new category of neural networks that are understandable and interpretable.

Figure 5:
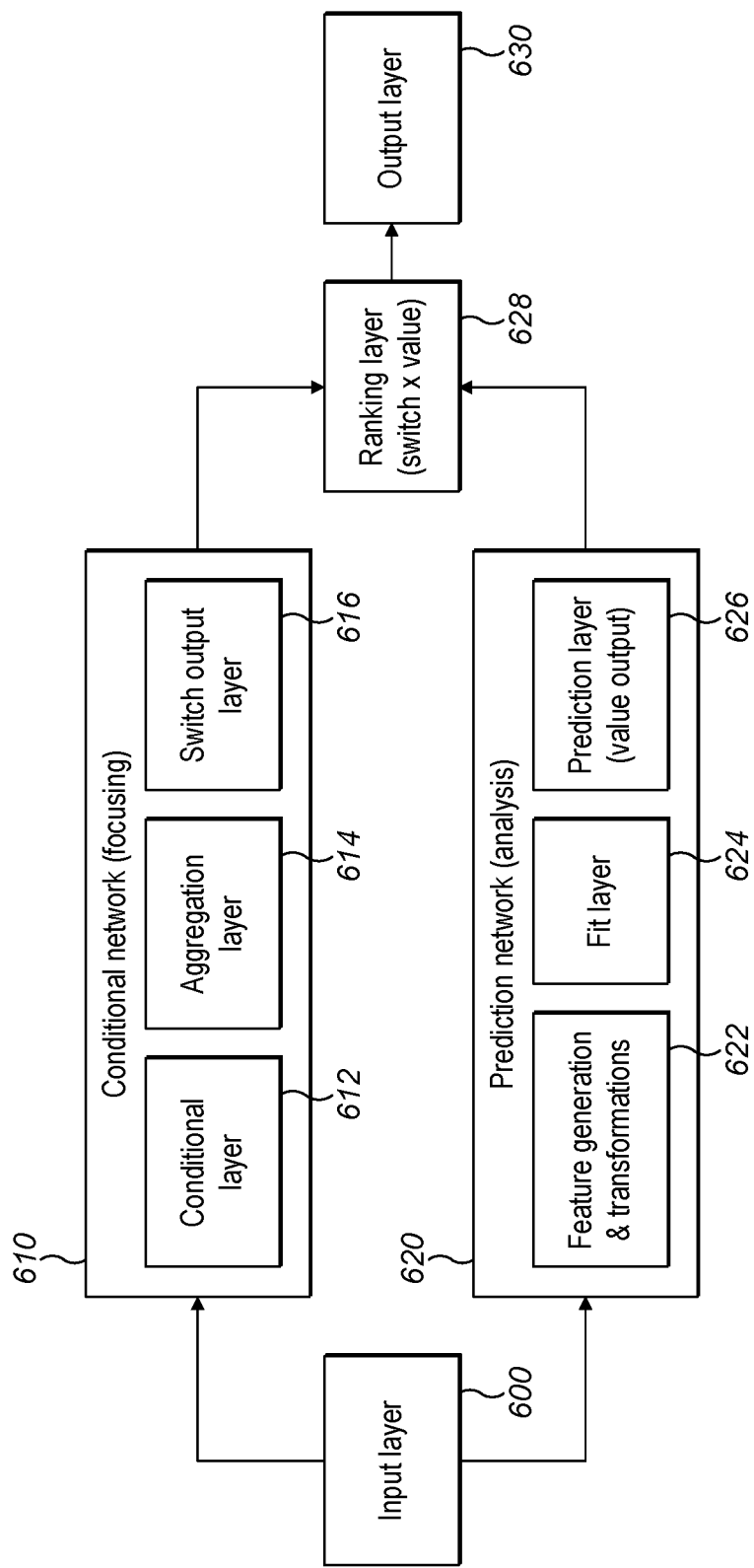
FIG. 5 is an exemplary embodiment of a high-level XNN architecture.

Referring now to exemplary FIG. 5, FIG. 5 may illustrate a schematic diagram of an exemplary high-level XNN architecture. An input layer 600 may be inputted, possibly simultaneously, into both a conditional network 610 and a prediction network 620. The conditional network 610 may include a conditional layer 612, an aggregation layer 614, and a switch output layer (which outputs the conditional values) 616. The prediction network 620 may include a feature generation and transformation 622, a fit layer 624, and a prediction output layer (value output) 626. The layers may be analyzed by the selection and ranking layer 628 that may multiply the switch output by the value output, producing a ranked or scored output 630. The explanations and answers may be concurrently calculated by the XNN by the conditional network and the prediction network. The selection and ranking layer 628 (roughly corresponding to component 740 in FIG. 6) may ensure that the answers and explanations are correctly matched, ranked and scored appropriately before being sent to the output 630 (roughly corresponding to component 760 in FIG. 6).

The processing of the conditional network 610 and the prediction network 620 is contemplated to be in any order. Depending on the specific application of the XNN, it may be contemplated that some of the components of the conditional network 610 like components 612, 614 and 616 may be optional or replaced with a trivial implementation. Depending on the specific application of the XNN, it may further be contemplated that some of the components of the prediction network 620 such as components 622, 624 and 626 may be optional or replaced with a trivial implementation.

It may be contemplated that in some circumstances, the selection and ranking layer 628 and the output 630 may be combined together into one integrated component. For optimization purposes, the XNN may also be implemented with both the conditional network 610 and the prediction network 620 together with all their components merged into one network. This merged conditional and prediction network may also be merged with a combined selection and ranking layer 628 and the output 630. This optimization may still result in a logically equivalent XNN, which may be faster for feed forward processing but may suffer when it comes to training via backward propagation and gradient descent techniques.

The XNN can thus be implemented in a way that there is the input layer 600, and a combination of the conditional network 610 and the prediction network 620, including the conditional layer 612, aggregation layer 614, switch output layer 616, feature generation and transformation layer 622, fit layer 624, prediction layer 626, and ranking layer 628 leading to the output 630. This combination may apply to all embodiments and implementations of the XNN, including both software and hardware implementations. The transformative capabilities of XNNs in this regard are unique and unparalleled in other neural network implementations since the white-box nature of XNNs allows flexibility and extreme merging to be performed without affecting the logical behavior of the XNN, although this can affect various attributes of a practical implementation, such as size/space usage, performance, resource usage, trainability, and overall throughput.

Figure 6:
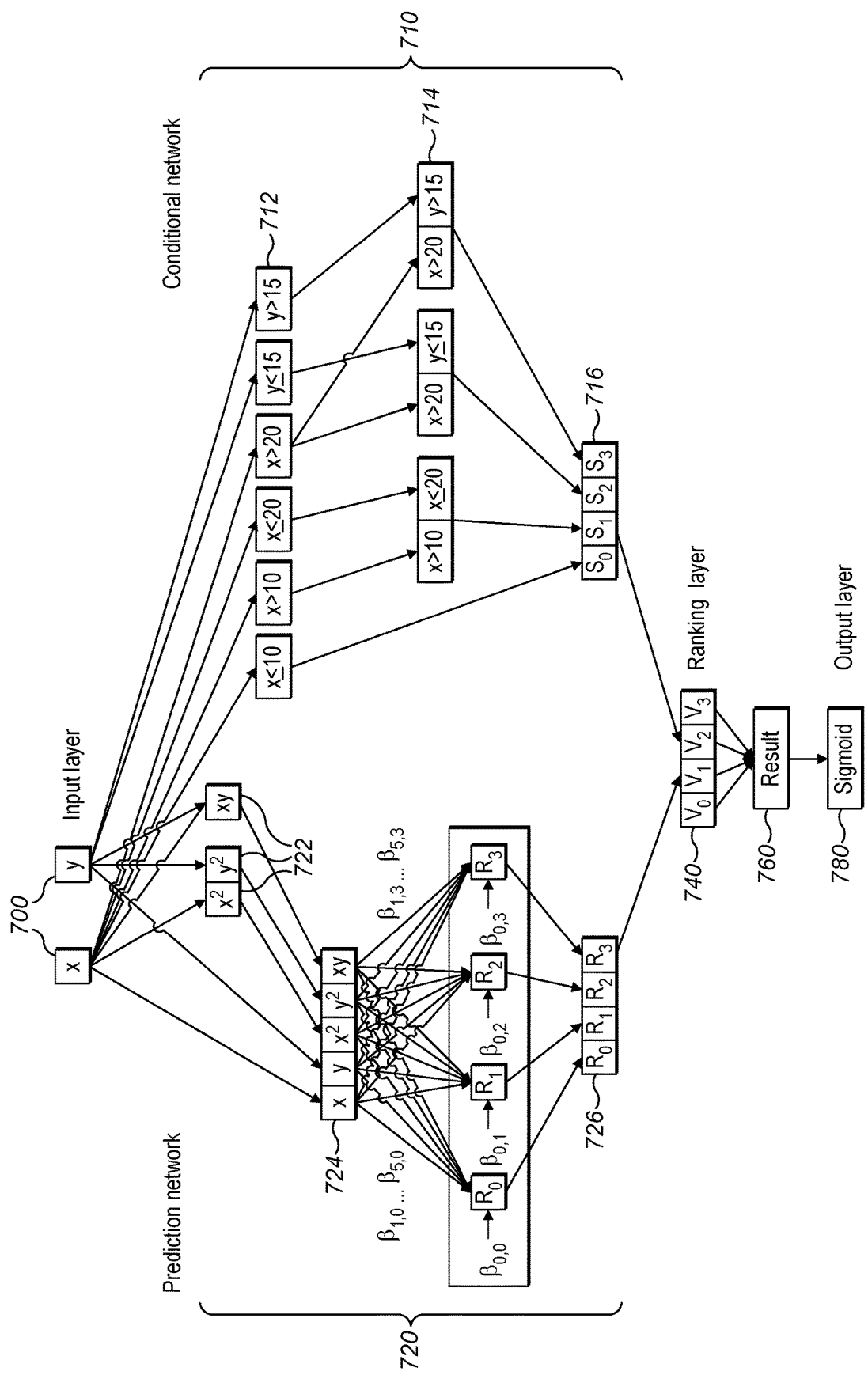
FIG. 6 is an exemplary embodiment of an exemplary XNN architecture.

Referring now to FIG. 6, FIG. 6 may illustrate an exemplary XNN architecture which combines the results from the switch output layer and the value output layer. The example depicted in FIG. 6 is logically equivalent to the following exemplary ruleset:

$$f(x, y) = \begin{cases} \text{Sigmoid}(\beta_{0,0} + \beta_{1,0}x + \beta_{2,0}y + \beta_{3,0}x^2 + \beta_{4,0}y^2 + \beta_{5,0}xy), & x \le 10 \\ \text{Sigmoid}(\beta_{0,1} + \beta_{1,1}x + \beta_{2,1}y + \beta_{3,1}x^2 + \beta_{4,1}y^2 + \beta_{5,1}xy), & x > 10 \wedge x \le 20 \\ \text{Sigmoid}(\beta_{0,2} + \beta_{1,2}x + \beta_{2,2}y + \beta_{3,2}x^2 + \beta_{4,2}y^2 + \beta_{5,2}xy), & x > 20 \wedge y \le 15 \\ \text{Sigmoid}(\beta_{0,3} + \beta_{1,3}x + \beta_{2,3}y + \beta_{3,3}x^2 + \beta_{4,3}y^2 + \beta_{5,3}xy), & x > 20 \wedge y > 15 \end{cases}$$

The ruleset may be found following the activation function 780. The exemplary architecture in FIG. 6 may begin with an input 700. The input may then be used as inputs to the conditional network 710 and the prediction network 720. The prediction network 720 may contain a feature generation and transformation layer 722, a fit layer 724, and a value output layer 726. The value output layer 726 may provide equations which correspond to rules which weigh different features of the inputs. Further, the input 700 may be used as input to the conditional network 710. Again, the conditional layer 712 and aggregation layer 714 may produce conjunctive rules or other logical equivalents or partitions which are represented in the switch output layer 716.

The outputs of the value output layer 626 and the switch output layer 616 may be combined 740 in the output layer 630. Once the output layer 630 has been formed, a sigmoid or other activation function 780 may be applied to the result 760, depending on the application.

XNNs may present an intuitive way to construct interpretable models, while still utilizing the power of ANNs and related methods such as deep learning. Once the model is trained through back-propagation or a similar method, the resulting neural network can be used to serve predictions and the inner structure of the XNN can be used to construct the rules.

XRL introduces an explainable reinforcement learning system. An exemplary embodiment may be based on the Bellman equation. XRL introduces explanations to the actions and the environment where the XRL system is deployed. An action may refer to the input provided to the environment, calculated by applying a policy to the current state. This may be discrete or continuous. The set of all possible actions is called the action space.

Figure 17:
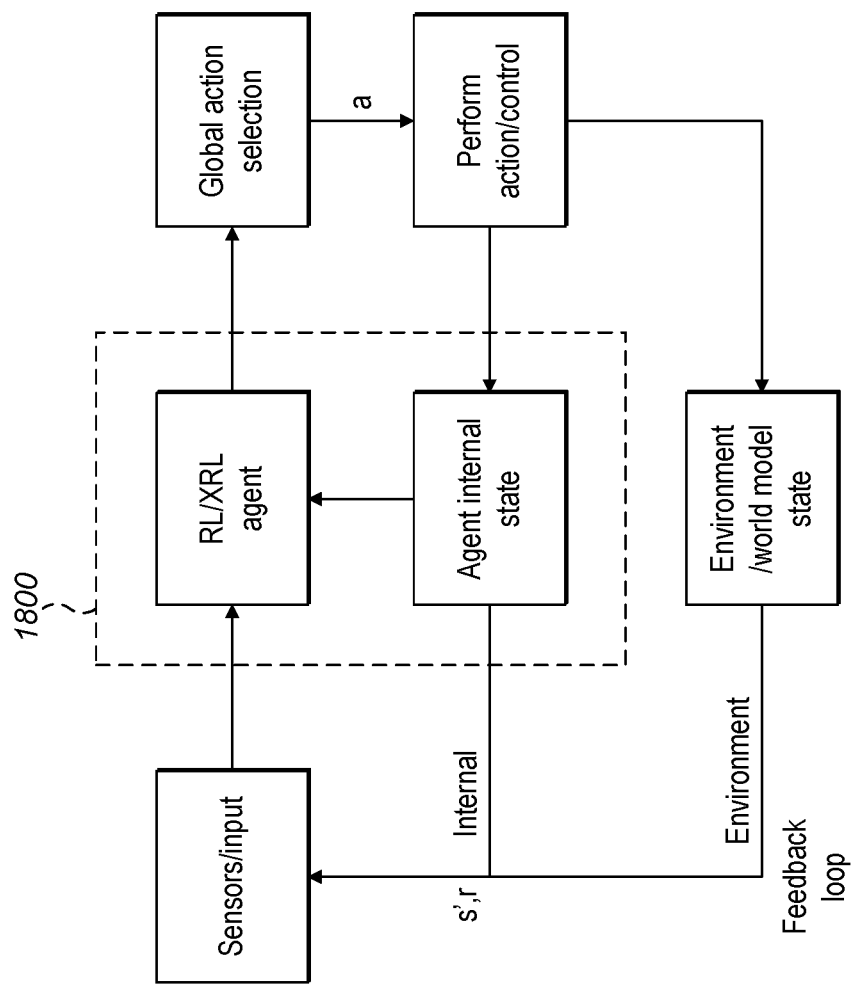
FIG. 17 is an exemplary embodiment of an XRL Agent FSM/Markov Process.

FIG. 17 shows the XRL agent FSM/Markov Process. An exemplary embodiment may include an action selection and ranking 1800, that is, some action a for the current state s, which leads to state s'. The reward is denoted by r. The XRL agent may have a simulation of the environment used in the action selection process. The model may have additional connection points, depending on the structure of the model itself. The XRL actor model may be implemented as an exemplary concurrent computation unit. An XRL actor may include a message queue and an internal state, where the message queue may contain messages received from other actors and the private state may be updated by the processing of a message. In an exemplary embodiment, internal states and message passing behavior can then be represented using various means including process calculus such as CSP, CCS, ACP, LOTOS, π-calculus, ambient calculus, PEPA, fusion calculus and the join-calculus. Such XRL actor models can have their behavior modelled using a combination of parallel composition of behaviors, communication and transmission models, sequential composition of behaviors, reduction and interpretation rules, and abstraction rules that hide complexity and inner workings of a component from other components.

An actor or agent may observe an ongoing situation in real-time and receive information with regards to the positioning and the orientation of the relevant objects. The agent observes the state of the world it is perceiving and abstracts it into a state representation. The state representation is used to predict the next state of the agent. An explainable agent or explainable aware agent may also utilize a combination of explanation, interpretation, and justification in its prediction.

An exemplary XRL modification introduces explanations x as part of the model/environment model. The world model may return a partial or full explanation regarding the state s' and the reward r, which defined as $x_e$. Another modification may be in the action space, which introduces an associate explanation, a, $x_a$ which denotes an action and explanation of the action, respectively. A policy may refer to the mapping from a past experience to an action. The policy Π, in XRL becomes $\Pi_x$, which is now an explainable mapping, such that:

$$\Pi_x \approx s \rightarrow a, x_a$$

$$\Pi_x \approx s, x_s \rightarrow a, x_a$$

In terms of behavioral FSM, each (state, action) pair can have a constant connection point prior to making the action, after selecting the state, during the action, and after the action is made. For reinforcement learning and XRL, another connection point may be before, during, and after the selection of the action under a policy π. This may be applicable when the action space and/or the state space is either discrete or continuous. Explanations in the XRL learning process may lead to better safety and control mechanisms since they may allow for better understanding of the inner working of the system which may require adjustments, monitoring, and automatic/manual interventions.

XTTs, may provide an alternative embodiment which uses: (i.) one or more transducers in a pipeline that outputs the answer together with an explanation as part of the transduction process, and/or (ii.) a suitable transformer architecture, that may optionally be a replacement for gated recurrent neural networks or similar types of machine learning models, where the attention mechanism is extended to cater to the creation of the explanation alongside the answer. The encoder part of the transformer encodes information about which parts of the input data are relevant to each other, together with information about what parts of the explanation data are relevant to each other and encodes this data in a latent space that includes both the answer and the explanation. The decoder part of the transformer decodes the encodings while using the attention mechanism to construct and then output both the answer and its associated explanation. It is contemplated that alternative embodiments may, for example, use separate latent spaces for the answer and the explanation, and other logical modifications may be found that may be amenable for practical and efficient implementations, especially for large scale parallel processing. Hardware deployments may also be contemplated.

Figure 7:
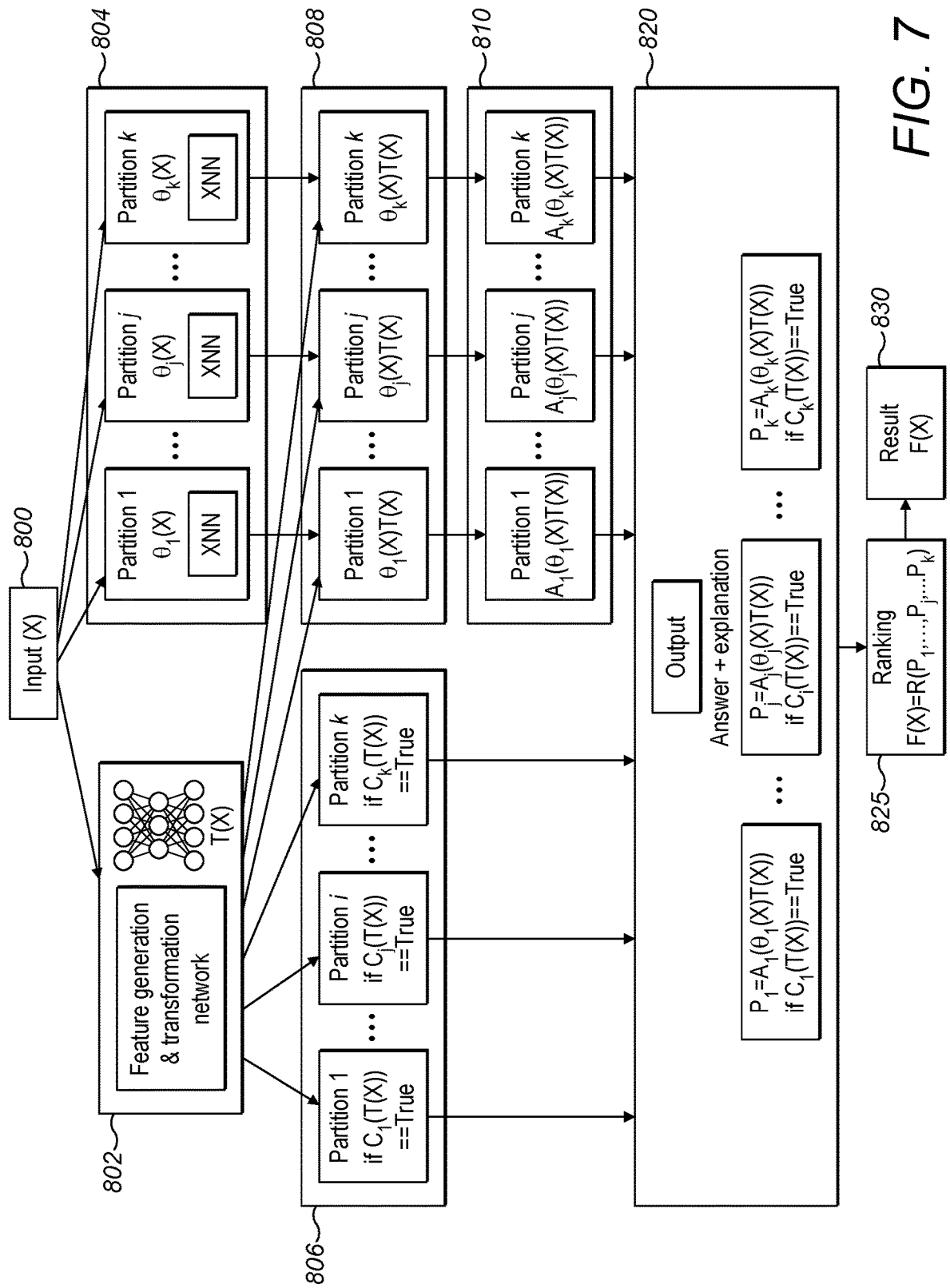
FIG. 7 is an exemplary embodiment of an INN architecture.

Referring now to the exemplary embodiment in FIG. 7, FIG. 7 may illustrate an exemplary INN architecture. INNs may provide an architecture which can automatically generate an explanation using existing deep learning techniques. INNs may utilize existing software infrastructures and hardware used for neural networks and may also remain fully compatible with backpropagation training techniques.

An exemplary INN architecture may include a feature transformer which converts the input to some hidden features, and a number of relevance estimators which transform the hidden features to feature weights. The feature weights are then combined with the transformed input in order to extract the attribution of each input transformed feature. The resulting feature attributions may then be aggregated for the result. Feature attribution may be extracted at different levels. In the simplest form, attribution may be linked directly with the original inputs. In other cases, such as CNNs, feature attribution may also be computed for higher-level features which are typically found in kernels and filters. Additionally, INNs may split the model into various partitions, thus enabling a higher-level of flexibility and interpretability, by enabling a mixture of local or segmented explainability. In some cases, INNs are also capable of providing global explainability.

Referring to FIG. 7, an exemplary INN architecture may start with some input vector X 800. The input 800 may then connect to a feature generation and transformation network 802 and to k relevance estimators 804. The transformed features may be abstract or high-level features which may be computed using a deep neural network such as a CNN, a non-linear mathematical function such as polynomial expansion, or some other form of generated features, which may be discrete or continuous. An exemplary relevance estimator may calculate the coefficient, at least in a local manner, of each transformed feature.

In mathematical terms, the transformation network may be denoted as a function $T(X)$. Similarly, $\theta_j(X)$ represents the relevance function of the jth partition. If $X \rightarrow T(X)$ returns a vector with z transformed dimensions, then $X \rightarrow \theta_j(X)$ also returns a vector with z coefficients, or relevance weights. It may be assumed that $|T(X)|=|\theta_j(X)|=z$.

INNs may be flexible enough such that complexity may be modeled through various options and possible configurations. The functions $X \rightarrow T(X)$ and $X \rightarrow \theta_i(X)$ may be a deep neural network which allow for modelling complex abstract features. It may be contemplated that the combination of $T(X)$ and $\theta_i(X)$ may represent various embodiments of explainable models which are possible to implement with the INN architecture.

An exemplary embodiment may include a conditional network 806, where the neural network handles the conditional aspect of the model. For example, an embodiment may evaluate rules in the form of IF-conditions in order to activate one or more partition. The output of $C_i(X)$ may be binary. It may be noted that the partitions may be static or dynamic and may be discovered either through an external partitioning process or through a connected neural network. It may also be noted that INNs may also function with only one partition. For example, for all values of X, $C_i(X)$ may always be one (1). This is equivalent to having zero partitions. In this exemplary case, there is no need to apply a partitioning method to find suitable partitions.

In the feature attribution network 808, the neural network may compute the feature attribution of each transformed feature, which is activated by the associated partition. The relevance attribution may multiply the result of the computed coefficient with the transformed feature. In mathematical terms, the feature attribution 808 may compute $\theta_j(X)T(X)$ for the jth partition. The output of layer 808 may serve as the basis of the explanation generation. The values from this layer may be used to generate feature attribution graphs, heatmaps, textual explanations or other forms of explanations. It is further envisaged that other forms of explanations may be grouped and/or structured in the form of Explanation Structure Models (ESMs).

In the aggregation layer 810, the neural network aggregates the results for each partition. This may be the predictive result for the activated partition. In mathematical terms, the aggregation function may be defined by $A_j(\theta_j(X)T(X))$. In an exemplary embodiment, the aggregation function may be a simple summation of the feature attributions. This becomes equivalent to a linear function, at least functioning in a local manner, such that the result $R_j=\theta_j(X)_1 T(X)+\ldots+\theta_j(X)_z T(X)$.

Finally, the switch layer 820 may select the activated partition. If more than one partition is activated, some ranking function 825 may need to be applied. The result may be generated through the result layer 830.

An exemplary embodiment may use causal modelling as part of an explainable framework. Causal inference may measure the effect of causes on specific units. In an exemplary embodiment, a medical application where causes t and c are known and modelled using a causal DAG may implement causal inferences. The output variable y of a causal inference measures the effect of the causes on a patient u, and can be illustrated as $y_t(u)$ and $y_c(u)$. The effect of the cause t on a patient u relative to cause c on a patient u can be measured using $Y_t(u)-Y_c(u)$.

Coefficients may be extracted from the explainable model and used as input to the causal inference model. The output of a causal model may be used to trigger an event or a terminal action 540 in the system.

Figure 13:
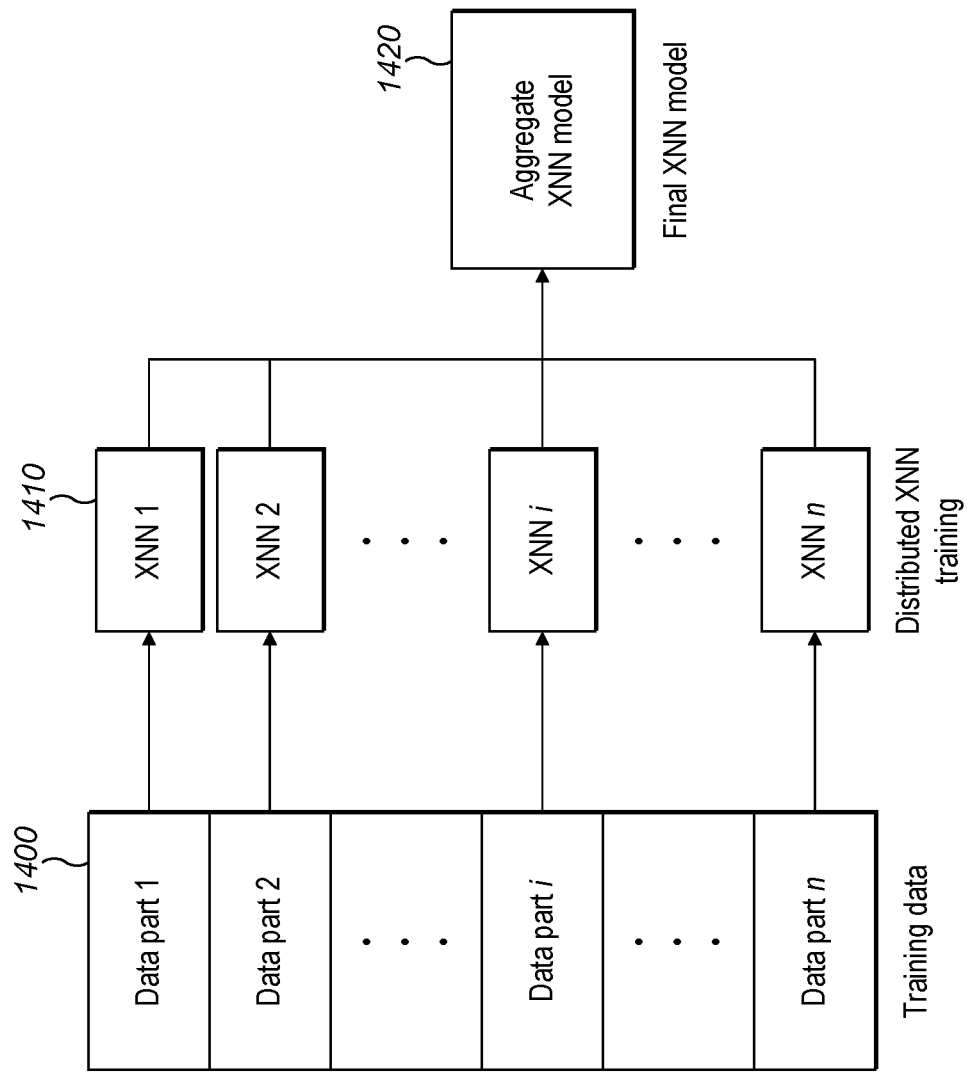
FIG. 13 is an exemplary embodiment of a distributed XNN training architecture.

Referring now to the exemplary embodiment in FIG. 13, FIG. 13 may illustrate an exemplary high-level architecture of a distributed XNN training system. A distributed explainable architecture DEA may be utilized in a behavioral model framework in order to increase the performance of the defined models. DEA may contain multiple explainable architectures $DEA_x$, such that $x \in \{XAI, XNN, XTT, XRL, XSN, XMN, INN\}$ or logically equivalent or similar architectures, where these architectures are processed in parallel. The number of explainable architectures 1410 in a distributed framework may be defined as $DEA_n$. FIG. 13 illustrates a high-level architecture of a distributed training system, where $DEA_x$ is the XNN architecture and $DEA_n$ is n models.

DEA may split the dataset 1400 into multiple subsets 1410 of data in order to train the explainable architectures $DEA_x$. The models trained in a DEA are aggregated 1420 during the training phase by calculating the average (or weighted average) from the parallel models. The aggregate model may be formed based directly on the weights of the model, rather than from the result of the individual models. An exemplary DEA may be useful for large datasets where the training data cannot fit in the CPU/GPU memory of a single machine.

DEA may include hybrid models, such that the models in the architecture are a mix of x, where $x \in \{XAI, XNN, XTT, XRL, XSN, XMN, INN\}$ or logically equivalent or similar architectures. An exemplary embodiment may implement multiple different models. In an exemplary embodiment, one data part may implement an XNN while another data part of the same system may implement an XAI. The models may then be combined to create an aggregate model. The aggregate model may be equal to x, where $x \in \{XAI, XNN, XTT, XRL, XSN, XMN, INN\}$ or logically equivalent or similar architectures or may be a hybrid model implementing multiple different models.

A DEA may incorporate multiple independent models where one model, once trained, can work independently without the need to rely on the full distributed architecture, which is optimized primarily for training purposes. The models in a DEA may be a variant of the explainable architectures x. Variants may include convolutional XNNs (CNN-XNNs), predictive XNNs (PR-XNNs), text XTTs (T-XTTs), and logically equivalent or similar architectures.

In an autonomous system or semi-autonomous system, a behavioral model BM may incorporate feedback actions $BM_{af}$ where $BM_{af} \in \{a_{f,1}, \ldots, a_{f,n}\}$ as an input to the underlying explainable architecture x, where $x \in \{XAI, XNN, XTT, XRL, XSN, XMN, INN\}$ or logically equivalent or similar architectures. $BM_{af}$ may represent feedback processes of sub-components within the behavioral model system of the system or an update process that is received from the server of the behavioral system BM.

An exemplary embodiment of a feedback process task may refer to an output from a trigger t in $BM_t$ being used to update specific internal parts of the explainable architecture x in $BM_x$. This may be possible since explainable architectures in $BM_x$ are white-box models and the coefficients and internal parts of the white-box models are interpretable. This operation may not be possible when using black-box models in the behavioral model BM.

Human knowledge injection (HKI) or system knowledge injection is another type of input in a behavioral model BM for autonomous systems or semi-autonomous systems. The coefficients θ of an explainable architecture x within a behavioral model BM may be modified to enforce specific rules. Rule enforcement may also be activated by a conditional constraint located in $BM_c$, where $BM_c \in \{c_1, \ldots, c_n\}$. The activation of a conditional constraint may fire an event e, where event e may activate a trigger t 530 where such rule enforcement is passed using a feedback action 550 to the explainable model 500 or causal architecture 510.

Figure 3:
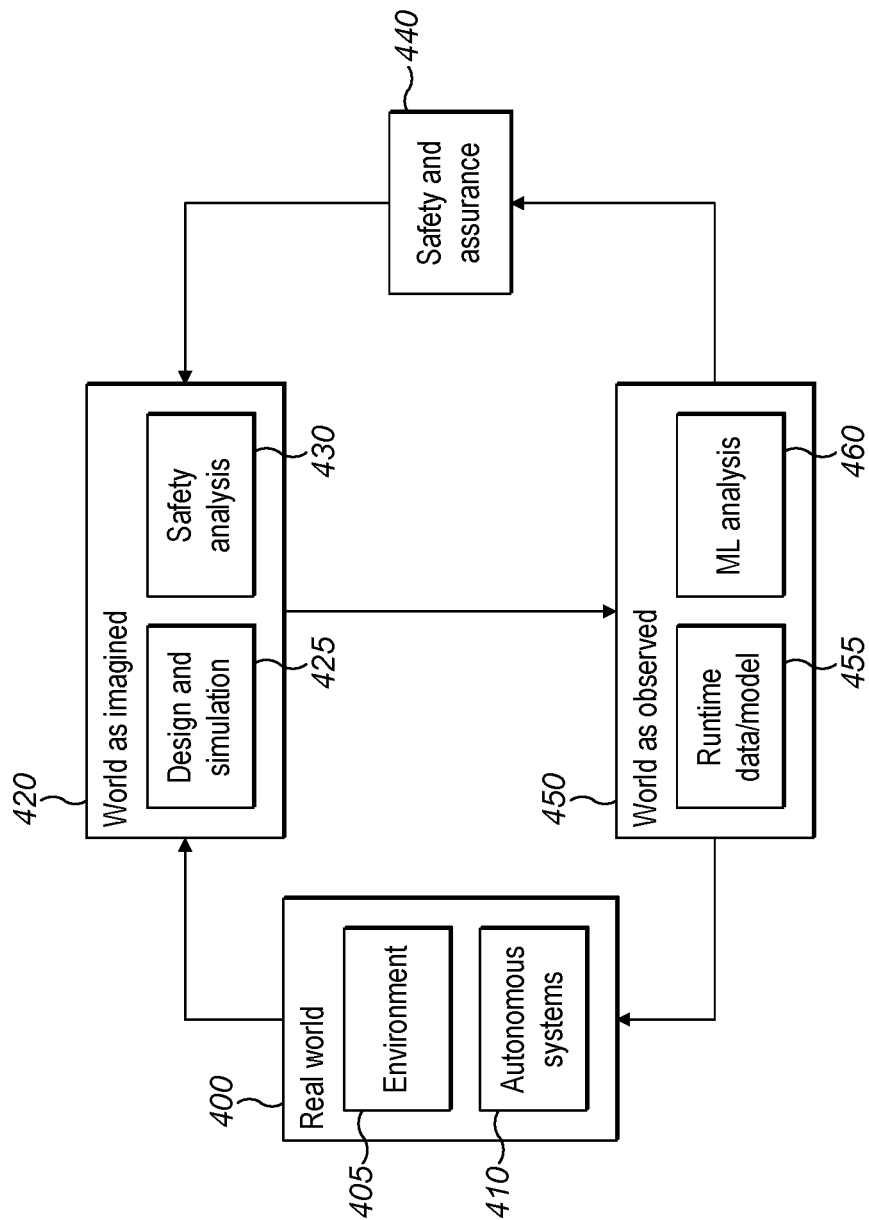
FIG. 3 is an exemplary embodiment illustrating a safety assurance framework as found in the prior art.

In an exemplary embodiment, each environment in the framework proposed by McDermid et al. (2019) may be seen as a behavioral model BM as described in FIG. 3. The Real World 400 represents the Desired Behavior Model (DBM). DBM represents the behavior the system is trying to achieve while utilizing explainable architecture and causal modelling. Note that the DBM may not always represent the Real World 400. If the BM is being applied to the Real World as its environment, the DBM typically equates to the Real World. However, in other scenarios, where different environments may be utilized (controlled environments, simulated environments, virtual environments, metaverse, etc.), the DBM may not equate to the Real World. DBM may be formally verified according to the given constraints in order to validate the system before being deployed in production. The observed behavioral model OBM 450 refers to the behavioral model that is deployed in the system and may be observed by gathering information via runtime monitoring of this model. The expected behavioral model EBM refers to the behavioral model that is constructed based on the world as imagined 420. The formal verifications, simulations and synthesis are based on the behavior that is imagined by the designer of such system, based on the imagined scenarios of the real world 400. The Safety and Assurance 440 constraints and guarantees may be represented by a behavioral model framework and/or behavioral model hierarchy that assures the safety, which may include conditional constraints and/or model boundaries, in the observed behavioral model OBM and/or the expected behavioral model EBM.

In an exemplary embodiment, an autonomous vehicle behavioral model system may be treating incoming objects from all directions equally, and the system may be aware that a specific location needs special attention. Hence, an event e may be fired as an input, either by a human during manual review of the system, or by the autonomous system itself. The event e may trigger a feedback action a. The action a may update the respective coefficients or create a rule or partition in the internal state of the underlying model in order to minimize the gap between the desired behavioral model DBM 400 and the expected behavioral model EBM 420, by tuning the observed behavioral model OBM 450.

A BM may include an explainable architecture x. Input constraints may be included during the formal verification of the explainable architecture of such behavioral model $BM_x$. Input constraints may be based on the internal coefficients of the white-box model, or the feature attributions constructed for the input dimensions of observation o. Feature attributions may identify the importance of a given feature with respect to the result. Hence, explainable architectures extend the verification process of behavioral modeling by allowing additional constraints to be designed on feature attributions in order to formally verify the white-box model for potential bias detection in the system.

The output of an exemplary BM within an autonomous or semi-autonomous system may include a model interpretation to be used for an explainable update to the user of the system. The model interpretation may also be used to update the underlying explainable architecture $BM_x$ or to update a sub-component within the autonomous or semi-autonomous system.

There may be three types of model interpretation: basic interpretation, explanatory interpretation, and meta-explanatory interpretation. A basic interpretation may refer to a prediction output o that can be understood by the sub-component. An explanatory interpretation may be represented by a 2-tuple vector <o, w> and may refer to a prediction output o combined with a model explanation w for the predicted value, that can be understood by the sub-component. A model explanation may include coefficients θ of the explainable architecture x that may be utilized to explain the feature importance of the input features for a given observation. A meta-explanatory interpretation may be represented by a 3-tuple vector <o, w, j> and may contain the prediction output o, the model explanation w and justification of the model explanation j. The model justification j may provide additional information about the assumptions, processes and decisions taken by the explanation system that were taken into consideration to produce the model explanation.

In an exemplary embodiment, an event e is fired based on a certain conditional constraint c. The event e may activate a trigger t. The trigger t may send a model interpretation of the underlying explainable architecture x in the form of an informative update, such as displaying a warning on the user interface, to the user using the autonomous or semi-autonomous system. An example of a warning can be that a vehicle is approaching the autonomous vehicle at an unusual acceleration.

In an exemplary embodiment, the behavioral model BM of an autonomous or semi-autonomous system may include singular or multiple direct actionable output $BM_a$, where $a \in \{a_1, \ldots, a_i\}$. An actionable output $BM_a$ may stop the vehicle or switch lanes to avoid a fatal accident. The autonomous system would take a direct action, using the vehicle controller, to modify the autonomous system properties in order to avoid a scenario.

The behavioral model of an autonomous or semi-autonomous system may include an event stream pipeline $P_e$, where $e \in \{e_1, \ldots, e_n\}$. Pipeline $P_e$ may include multiple events that may be fired from the same sub-component. The final output of pipeline $P_e$ may be a terminal action $a_t$ or a feedback action $a_f$ which may be used to update the coefficients of the internal structure of an explainable architecture x.

A BM of an autonomous system or semi-autonomous system may contain a set of actions, where $BM_a \in \{a_1, \ldots, a_n\}$, that may perform a change to the status of a sub-component within the BM or raise an event e within the behavioral model BM. Actions $BM_a$ may be triggered by a trigger t. A BM may contain a set number of triggers $BM_t \in \{t_1, \ldots, t_n\}$. A trigger t may be activated when a condition c set for an exemplary trigger, $t_c$, is set to true. A trigger t may have multiple sets of conditions to be activated, such that $t_c \in \{c_1, \ldots, c_n\}$. The trigger t may have a recency and frequency attribute that may either increment or decrement the triggering rate according to the activation history of the trigger t. In a practical exemplary embodiment within the aviation industry, a trigger t may be defined as: If the conditional constraint c "altitude is below threshold β" is true, a feedback action $a_f$ should trigger.

Figure 18:
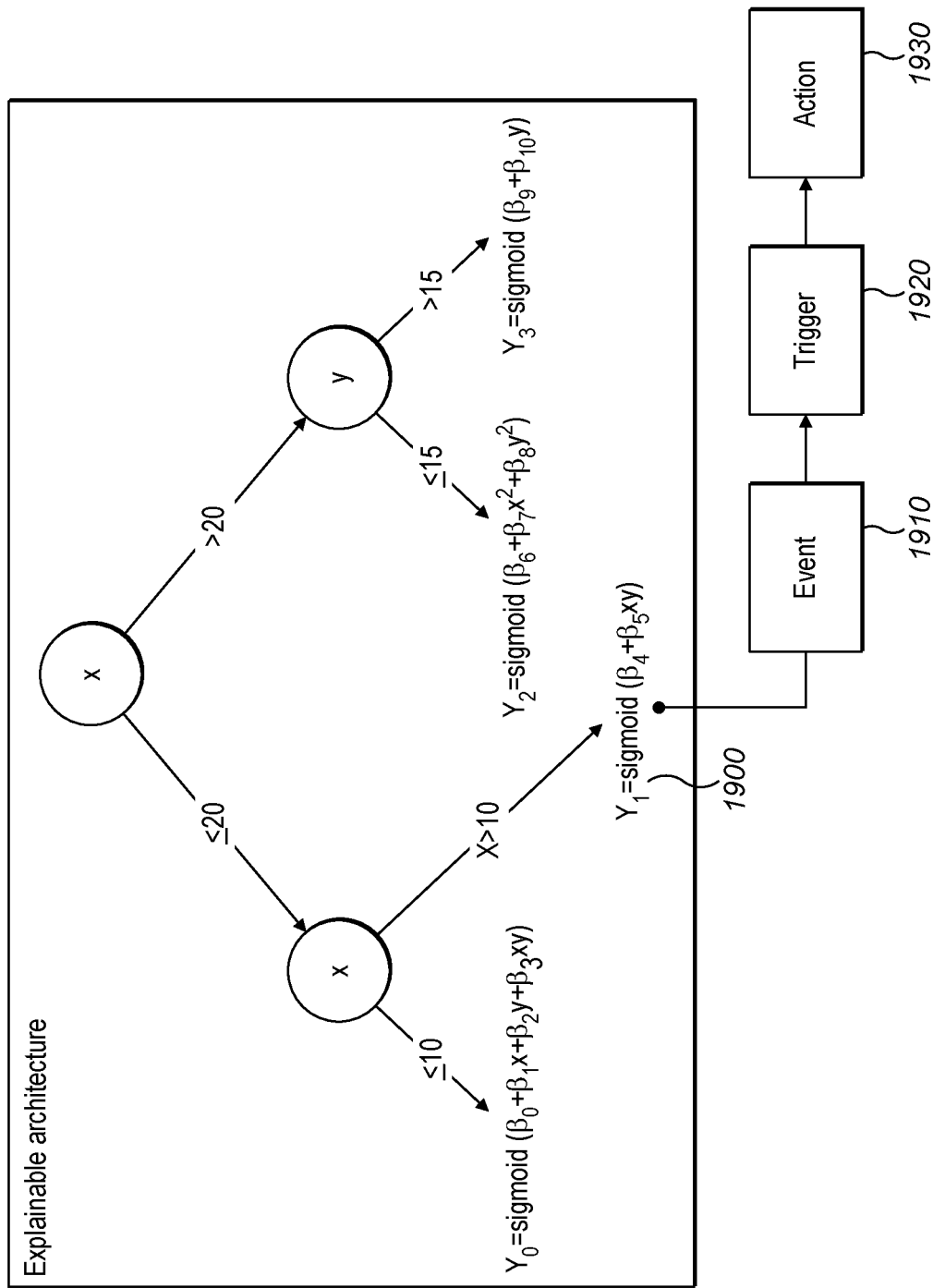
FIG. 18 is an exemplary embodiment of a conditional constraint on an explainable architecture.

The activation of a conditional constraint c may fire an event e to activate a trigger t. A particular conditional constraint c set on the Explainable System 570 may have multiple events associated with it, such that $c_e \in \{e_1, \ldots, e_n\}$. In an exemplary embodiment, a conditional constraint c is set on a coefficient in the explainable architecture 1900, as shown in FIG. 18, and upon activation, fires an event e 1910 to activate a trigger t 1920 in order to activate an action a 1930. It is contemplated that triggers, events and conditions may implemented using a pipeline or stream.

Figure 4:
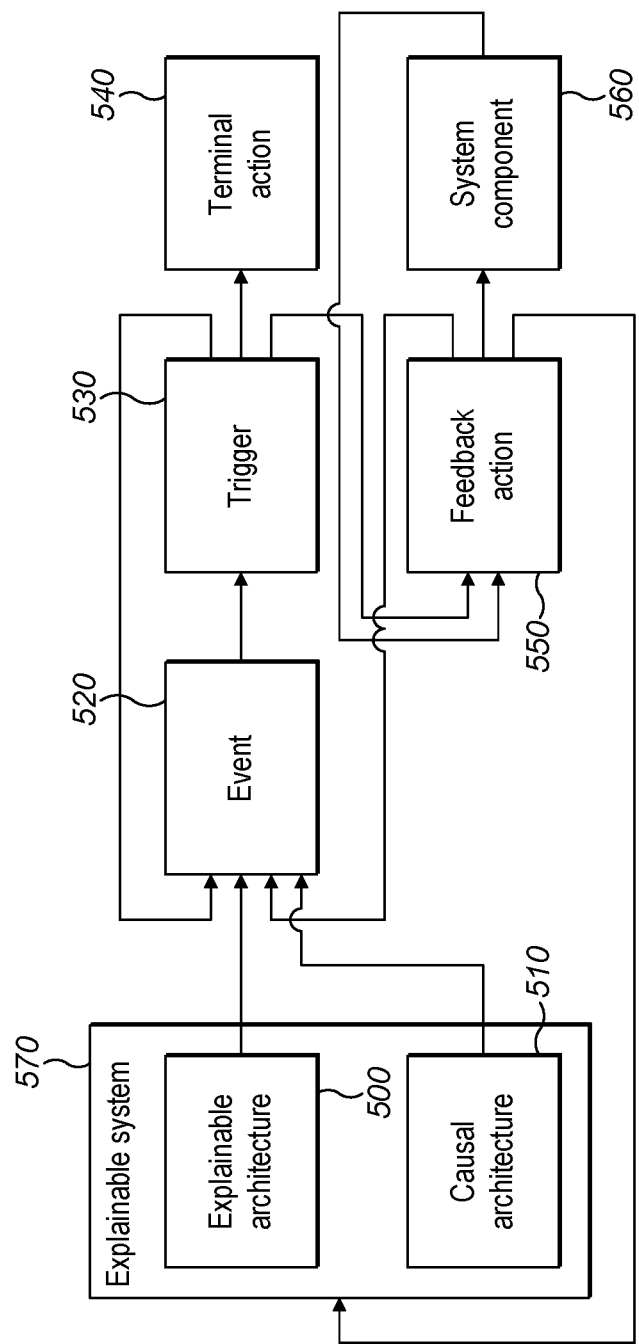
FIG. 4 is an exemplary embodiment of a behavioral model for safety and assurance in ML-based Systems.
Figure 9:
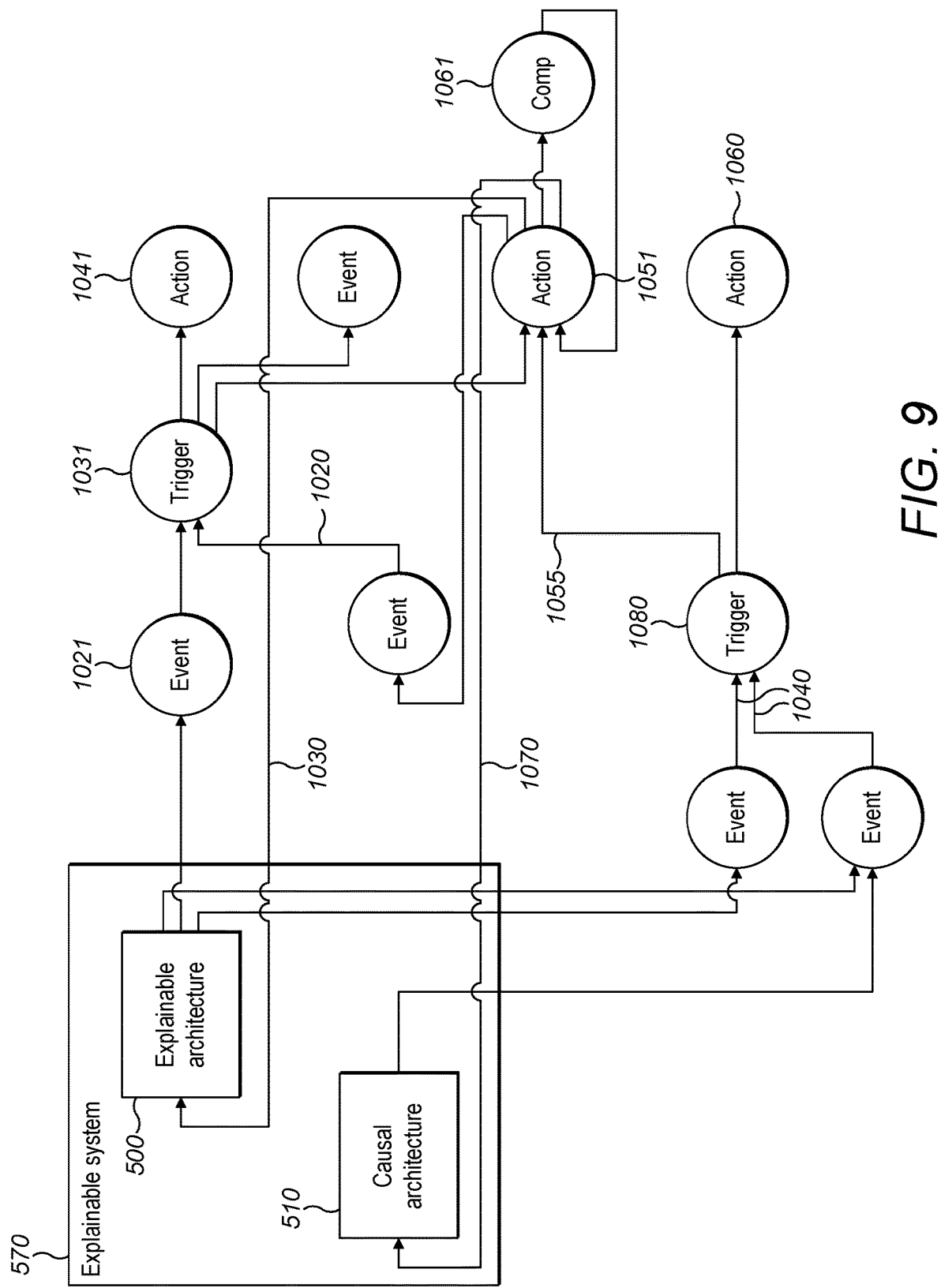
FIG. 9 is an exemplary embodiment of an explainable behavioural model framework.

Referring now to the exemplary embodiment in FIG. 9, FIG. 9 may illustrate a schematic flowchart of an instance of an exemplary explainable behavioral model framework. A condition c may be a constraint statement that may be set on the internal coefficients of the explainable architecture x 500, where x∈{XAI, XNN, XTT, XRL, XSN, XMN, INN} or logically equivalent or similar architectures, the internal coefficients of the causal model 510, or on any variable within the behavior model BM. The activation of such conditional constraint c, may cause an event e 520 in FIG. 4 and event e 1021 or 1040 in FIG. 9 to be fired to a particular trigger t 530 in FIGS. 4 and 1080 or 1031 in FIG. 9, in order to trigger 1055 a particular action a 540 or 550 in FIGS. 4 and 1041, 1051, or 1060 in FIG. 9. An event e may trigger additional events within a BM, trigger a terminal action $a_t$ 540 in FIGS. 4 and 1041 or 1060 in FIG. 9, or trigger a feedback action $a_f$ 550 in FIGS. 4 and 1051 in FIG. 9 A feedback action $a_f$, 550 in FIGS. 4 and 1051 in FIG. 9, may trigger sub-components 1061 within a BM to perform a particular task, execute an event e in an acyclical manner 1020 or execute an event e in a cyclical manner 550, 560 as shown in FIG. 4. A feedback action $a_f$, 550 in FIGS. 4 and 1051 in FIG. 9, may be used as behavioral model knowledge injection to update internal parts of an explainable architecture or causal architecture 1070 or 1030. Feedback actions may also be handled by causal logics that can handle cyclical causal models, for example, using Input/Output SCMs (ioSCMs), temporal unrolling or other suitable methods. In an exemplary embodiment, a conditional constraint c may be set on a coefficient in the explainable architecture 1900, as shown in FIG. 18, and upon activation, fires an event e 1910 to activate a trigger t 1920 in order to activate an action a 1930.

The triggers of a behavioral model $BM_t$ may link its neuro-symbolic conditions with its previous historic rate of activations in order to constrain the rate of trigger activation. In an exemplary embodiment, a trigger $t_i$ may be based on the fusion of two conditions $c_{n-1}$ and $c_{n-2}$. An additional trigger $t_{i-1}$ may be based on the conditional constraint $c_{n-2}$. Hence, when an event is fired to activate the trigger $t_i$, trigger $t_{i-1}$ is also activated, as the conditional constraint $c_{n-2}$ was activated in order to activate the trigger $t_i$. The fusion of conditions may be based on multiple models, within a behavioral model, such as causal model 510 and an explainable architecture x 500, where x∈{XAI, XNN, XTT, XRL, XSN, XMN, INN} or logically equivalent or similar architectures, to trigger an internal action 1051 or trigger a terminal action 1060.

A condition c may be a constraint statement that may be set on the Explainable System 570, such as on the internal coefficients of the explainable architecture x 500, the internal coefficients of the causal model 510, or on any variable within the behavior model BM of such autonomous system or semi-autonomous system. The activation of the conditional constraint c, may cause an event e 520 1040 to be fired to a particular trigger t 530 1080 in order to trigger an action a 540 550 1051 1060. A conditional constraint c may be constructed of a binary constraint, a signal constraint or be associated with an activation function in the underlying explainable architecture x. A condition c may be based on other conditions in a hierarchical form. A condition may be of the form of conjunctive normal form (CNF), or disjunctive normal form (DNF), or a suitable first order logic in order to be compatible with formal verification problem solvers such as Satisfiability module theories (SMT) and conflict-driven clause learning (CDCL) Satisfiability (SAT) solvers.

In an exemplary behavioral model BM, a neuro-symbolic conditional constraint c, that is based on the Explainable System 570, such as on the explainable architecture x 500, where x∈{XAI, XNN, XTT, XRL, XSN, XMN, INN} or logically equivalent or similar architectures, may fire an event e, where event e may also be fired by a different conditional constraint on the causal inference architecture 510. This exemplary embodiment eliminates redundant identical events from the behavioral model $BM_e$. A trigger t may require multiple events to be received in order for the trigger to be activated. This exemplary approach enables modularity of events $BM_e$, conditional constraints $BM_c$ and triggers $BM_t$ in a behavioral model. It is further contemplated that similar techniques may be utilized to eliminate redundant components from the BM including a combination of events, triggers, conditions, and actions.

A neuro-symbolic constraint may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic, topological transforms of Kolmogorov/Frechet/Hausdorff/Tychonoff spaces, and difference analysis. Neuro-symbolic constraints may also be implemented in form of a data structure that references the different features and variables accessible to the explainable model and any associated taxonomies, ontologies, and causal models. Neuro-symbolic constraints may also be implemented in the form of knowledge graph networks.

The triggers of such behavioral model $BM_t$ may link its neuro-symbolic conditions with its previous historic rate of activations in order to constrain the rate of trigger activation. In an exemplary embodiment, a trigger $t_i$ may be based on the fusion of two conditions $c_{n-1}$ and $c_{n-2}$. An additional trigger $t_{i-1}$ may be based on the conditional constraint $c_{n-2}$. Hence when an event is fired to activate trigger $t_i$, trigger $t_{i-1}$ is also activated, as condition $c_{n-2}$ was activated in order to activate trigger $t_i$. Such fusion of conditions may be based on multiple models, within a behavioral model, such as a causal model and/or an explainable architecture x, where x∈{XAI, XNN, XTT, XRL, XSN, XMN, INN} or logically equivalent or similar architectures, to trigger an internal action or trigger a terminal action.

An event e 520 may trigger additional events or event sequences (also known as an event cascade or event pipeline) within a behavioral model BM, trigger a terminal action $a_t$ 540 1060 or trigger a feedback action $a_f$ 550. A feedback action $a_f$ 550 may trigger sub-components within a behavioral model BM to perform a particular task, execute an event e in an acyclical manner or execute an event e in a cyclical manner in order to activate a particular trigger. A feedback action $a_f$ 550 may be used as behavioral model knowledge injection to update internal parts of an explainable architecture 1030 or causal architecture 1070.

Figure 10:
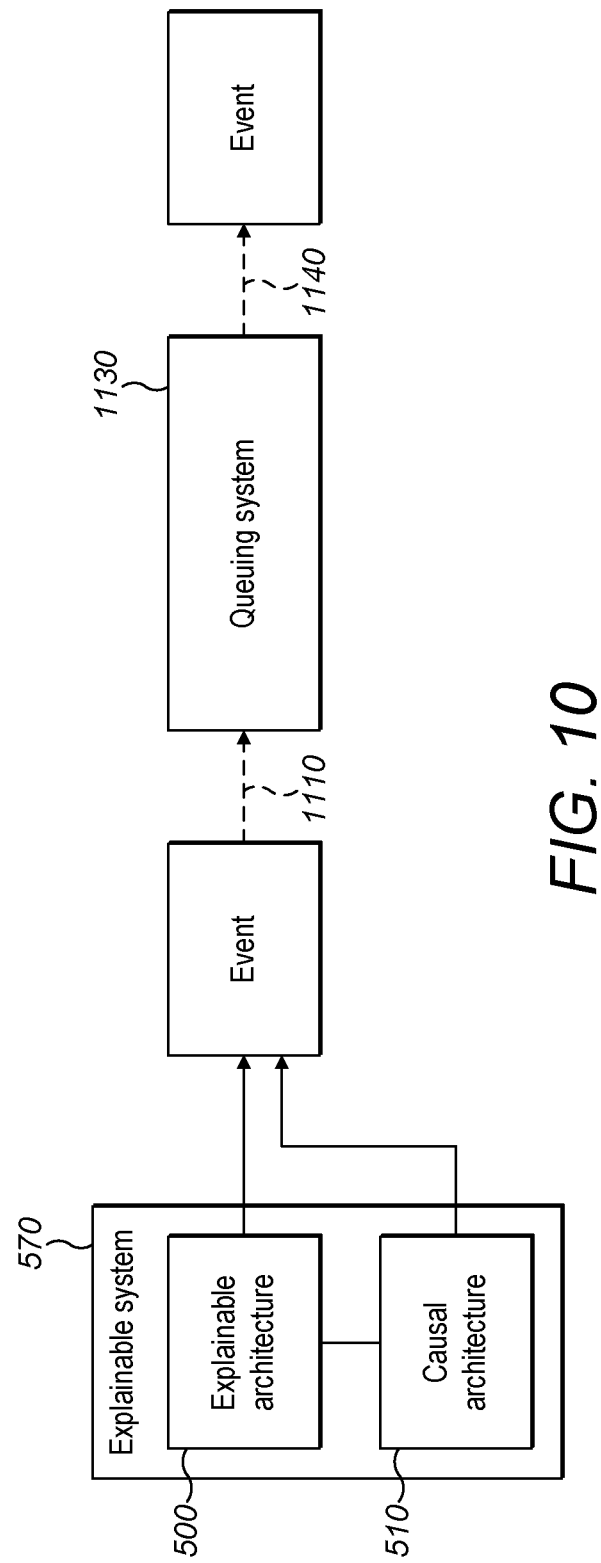
FIG. 10 is an exemplary embodiment of a queueing system for events in an exemplary behavioral model framework.

An event e may be relayed and processed by a message broker, as shown in FIG. 10. A message broker may be an architectural pattern used to exchange messages effectively between components of a behavioral system using asynchronous communication between components. Events received 1110 by the message broker are normally queued in a queueing system 1130 that may be located in the message broker, and which utilizes a queue data structure, such as a buffer, for the received messages. Events e may then be processed 1140 to the respective sub-components in the behavioral model BM.

Figure 8:
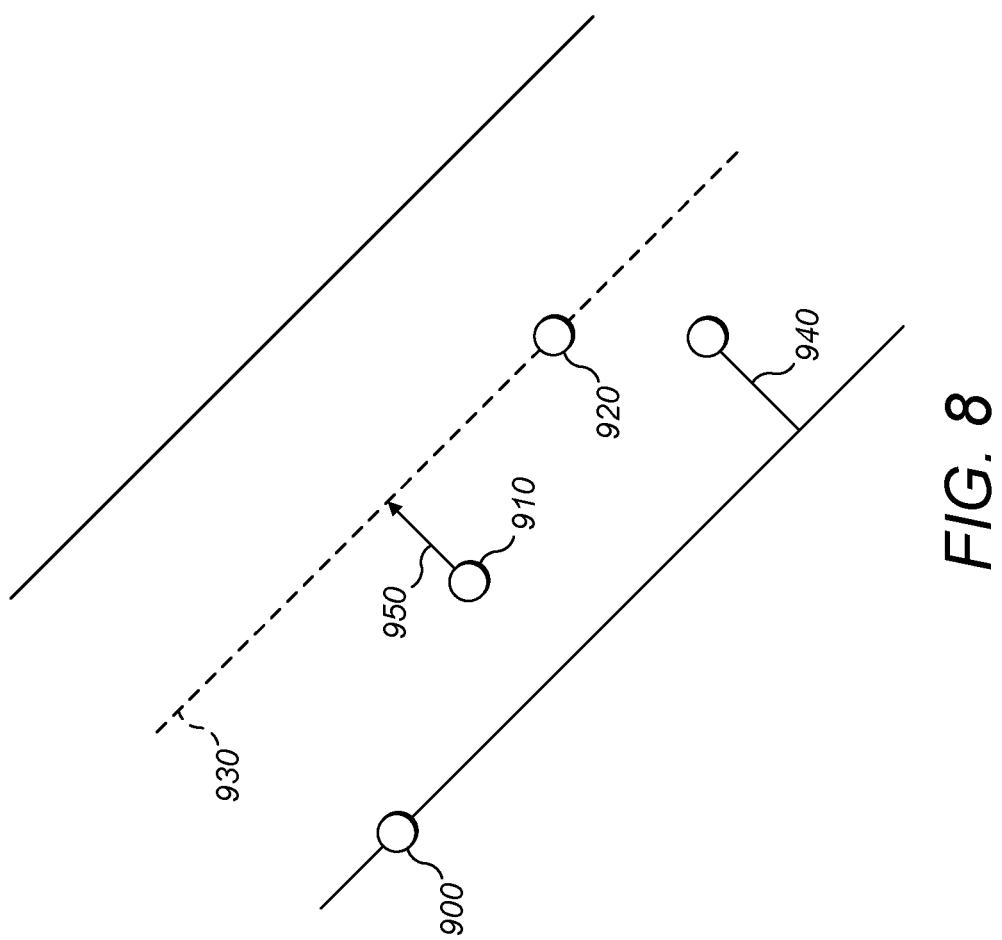
FIG. 8 is an exemplary embodiment of a decision boundary for proximity events.

An event e that is attached to at least one conditional constraint c may be known as bounded event $e_{bounded}$. A concern event $e_{concern}$ may be a bounded event $e_{bounded}$ that may refer to a safety concern in an autonomous system or semi-autonomous system. A concern event $e_{concern}$ may raise awareness to the user of the system if a particular condition continues to be true. A concern event $e_{concern}$ might be bounded to a conditional proximity constraint c, as shown in FIG. 8, and hence may be compared to a confidence interval or boundary range around the boundary 930. The boundary range may be learnt using machine learning models and can be extended to any number of dimensions.

It is further contemplated that the boundary range may have an associated set of tolerances and/or confidence intervals that allows for flexibility in the boundary range definition. It is further contemplated that the boundary range may have an associated boundary transformation function that dynamically transforms a combination of the boundary range, tolerances, confidence intervals or other suitable boundary and/or boundary characteristic on an Explainable System 570 using a suitable transformation function such as a feedback loop control method, Nyquist control, Bode plot, fuzzy logic transform (Type 1, Type 2, Sugeno, Mamdani, etc.), transforms learnt via gradient descent methods, transforms specified via rule systems, first order logic, rotations, dimensional scaling, dimensionless scaling, Fourier transforms, Walsh functions, state-space transforms, phase-space transforms, Haar and non-Haar wavelets, generalized L2 functions, fractal-based transforms, Hadamard transforms, knowledge graph networks, categorical encoding, topological transforms of Kolmogorov/Frechet/Hausdorff/Tychonoff spaces, difference analysis, causal operators and other suitable transformations.

A concern event $e_{concern}$ that is bounded to a conditional proximity constraint c may be utilized to raise several warnings or raise a red flag to the autonomous system or semi-autonomous system to execute a terminal action a in order to perform an action, such as to avoid a fatal accident, for example. A conditional proximity constraint c, set on the internal components of an Explainable System 570, may be a binary proximity, which refers to if the boundary range has been violated or not. A violation of the conditional proximity constraint c may trigger a feedback action or a terminal action. A conditional proximity constraint c, set on the internal components of an Explainable System 570, may be probabilistic or may include several values which represent different states in the behavioral system. The probabilistic or multi-valued proximity constraint c may be attached to multiple triggers $c_t$, where $t \in \{t_1, \ldots, t_n\}$.

The boundary of a conditional proximity constraint c set on the internal components of an Explainable System 570, may be learnt using a machine learning model. A hyperplane may be constructed and maximized using a machine learning model. The outcome values of the conditional proximity constraint c may support a hyperplane 900 as illustrated in FIG. 8. If a boundary is about to be transgressed 910, a concern event $e_{concern}$ may be raised in order to trigger the appropriate action. The distance 940 may be measured in the conditional space in order to fire an event with accurate representation of the current distance of the proximity conditional constraint to activate the respective action. The distance remaining 950 for the conditional proximity constraint to be transgressed may be measured in order to fire an event with an accurate representation of the current distance of the proximity conditional constraint to activate the respective action. A conditional proximity constraint that has just been transgressed 920 may raise a concern event $e_{concern}$ in order to trigger the appropriate action.

It is further contemplated that an action a arising from a conditional proximity constraint c may dynamically transform a combination of the boundary range, tolerances, confidence intervals or other suitable boundary range characteristic on an Explainable System 570 using a suitable transformation function such as a feedback loop control method, Nyquist control, Bode plot, fuzzy logic transform (Type 1, Type 2, Sugeno, Mamdani, etc.), transforms learnt via gradient descent methods, transforms specified via rule systems, first order logic, rotations, dimensional scaling, dimensionless scaling, Fourier transforms, Walsh functions, state-space transforms, phase-space transforms, Haar and non-Haar wavelets, generalized L2 functions, fractal-based transforms, Hadamard transforms, knowledge graph networks, categorical encoding, difference analysis, causal operators and other suitable transformations.

In an exemplary embodiment, an autonomous vehicle behavioral model system may be treating incoming objects from all directions equally, and this system may be aware that a specific location needs special attention. Hence, an event e may be fired as an input, either by a human during manual review of the system, or by the autonomous system itself. The event e may trigger a feedback action a and such action a updates the respective coefficients or create a rule or partition in the internal state of the underlying model, in order to minimize the gap between the desired behavioral model DBM 400 and the expected behavioral model EBM 420, by tuning the observed behavioral model OBM 450.

BMs may utilize causal logic including a combination of Pearl's structural causal models and associated derivations and variations, dynamic causal models and associated Bayesian model comparison methods and variations, granger causal models, relativistic causal models arising from special and general relativity, and other suitable implementations that allow machine learning to represent cause-and-effect. In an exemplary embodiment, a BM may use causal logic to add cause-and-effect constraints on possible scenario interpretations, increase overall safety and ensure a correct behavioural response from an autonomous system that handles context in a more similar way to how humans handle context. It is further contemplated that the what-if, what-if-not and generic counterfactual processing (Rung 2 and Rung 3 of Pearl's Ladder of Causation) may be used to enhance the BM and BMH capabilities further.

Causation may be defined as a structural causal Model SCM in order to describe the features of the datasets, being utilized by the model, and the interactions between these features. A Structural causal Model SCM may include three components: U, V and $f$. U may refer to variables that are external to the causal model and are not a descendant of any other variables. U may refer to exogenous variables. V may refer to variables that are a descendant of at least one exogenous variable. V may refer to endogenous variables. The component $f$ may refer to the functions that are utilized to derive V variables from the U variables.

A Structural causal Model SCM may be associated with a directed acyclic graphical model. A graphical model G may contain N nodes and E edges. The graphical model $G_N$ contains a node for each exogenous variable in $SCM_U$, where $U \in \{U_1, \ldots, U_n\}$, and a node for each endogenous variable in $SCM_V$, where $V \in \{V_1, \ldots, V_n\}$. The edges $G_E$ of an exemplary graphical model may refer to the functions used to derive the endogenous variables $SCM_V$. The graphical causal model G may have conditional constraints $G_c$, where $C \in \{c_1, \ldots, c_n\}$, set on the values of $G_N$, such that if the values exceed certain threshold t, an event e is fired to activate a trigger t. The trigger t may execute a terminal action or a feedback action to update internal coefficients of a causal model, update internal coefficients of an explainable architecture x, or update a sub-component within the behavioral model BM.

Figure 16:
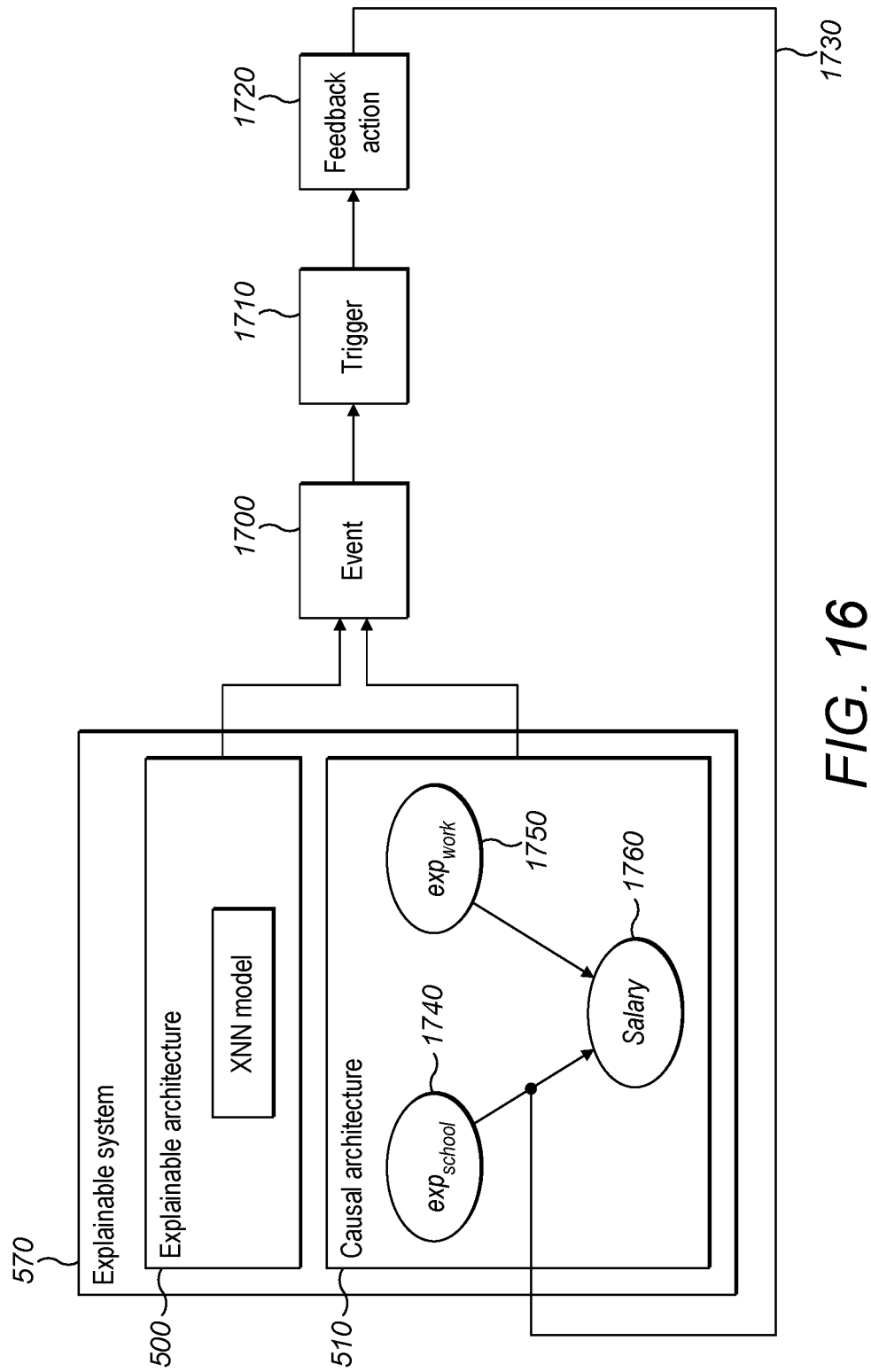
FIG. 16 is an exemplary embodiment of a Structural Causal Model integrated in a Behavioral Model.

In an exemplary embodiment, as illustrated in FIG. 16, $SCM_U = \{\text{experience}_{school}, \text{experience}_{work}\}$ 1740 1750, $SCM_V = \{\text{salary}\}$ 1760 and $SCM_f = \{f_{salary}\}$, where $f_{salary} := (2*\text{experience}_{school}) + (3*\text{experience}_{work})$. As shown in FIG. 16, the variables experience$_{school}$ 1740 and, experience$_{work}$ 1750 are direct causes of the salary variable. A conditional constraint may be based on the values of the experience$_{school}$, experience$_{work}$ or salary variables. A conditional constraint may be based on $f_{salary}$, specifically on particular variables within the equation. An exemplary behavioral model BM allows for the fusion of conditional constraints in order for the activation of a trigger t; hence multiple conditional constraints may be based on the graphical causal model 510 and on the explainable architecture 500. An event 1700 may be fired on the activation of conditional constraints for a particular trigger 1710 within the behavioral model to execute a terminal action or a feedback action 1720 to update internal coefficients of a causal model 1730, update internal coefficients of an explainable architecture x, or update a sub-component within the behavioral model BM.

In an exemplary embodiment, a BM will use a suitable computational and knowledge representation structure as the basis of its constraint and predictive logic implementation. Such a suitable structure may be a Resource Description Framework (RDF) tree, RDF graph, or other suitable form of graph structure. It is further contemplated that a hypergraph structure or a simplicial complex may be used in a practical BM implementation.

A BM may set conditions based on the global feature attributions of the input dimensions of an explainable architecture x, in an Explainable System 570. It is further contemplated that a BM may set conditions based on the local model feature attributions and/or the hierarchical partition structure of an explainable architecture x. In a generalized format, let m represent the number of input dimensions (example x, y) and some transform function Transform (X) takes a matrix of m dimensions and returns a matrix with k transformed dimensions (for example, x, y, $x^2$, $y^2$, xy). Let C represent a matrix of coefficients where j represents the total number of rules in the rule-based model.

$$C = \begin{bmatrix} C_{0,0} & \cdots & C_{0,k-1} \\ \vdots & \ddots & \vdots \\ C_{j-1,0} & \cdots & C_{j-1,k-1} \end{bmatrix}$$

The matrix of coefficients may then be aggregated such that the vector I represents the importance of each feature from all j rules such that $I = \{\theta_0, \ldots, \theta_i, \ldots, \theta_{k-1}\}$ where $\theta_i = \Sigma_{p=0}^{j-1} C_{p,i}$. Finally, let $I_s = \{F_0, \ldots, F_s, \ldots, F_{k-1}\}$ represent a sorted vector with all elements of I where s represents the sort index, such that $F_{s-1} \geq F_s \geq F_{s+1}$. A mapper vector M may also be used to link the sorted coefficient index s with the transformed feature index k. A BM may create conditions $BM_c$ based on fusion between matrix coefficients and the input dimensions of the current observation. It is further contemplated that other suitable implementations of I, $\theta$, F and M and/or any other part of the BM may be alternatively implemented to allow for logically suitable extensions such as Type 1 and Type 2 fuzzy logic systems and other suitable logic systems that allow for behavioral modelling and/or specifications. Constraints and expressions underlying conditions, events, triggers and actions may be implemented in a variety of suitable exemplary implementations including, but not limited to, in the form of symbolic rules or system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic, topological transforms of Kolmogorov/Frechet/Hausdorff/Tychonoff spaces, and difference analysis. Constraints and expressions may also be implemented in form of a data structure that references the different features and variables accessible to the explainable model and any associated taxonomies, ontologies, and causal models. Constraints and expressions may also be implemented in the form of knowledge graph networks. Other constraints and expressions may also be implemented on the basis of useful heuristics, such as control charts, Nelson rules, Bode plots, Nyquist plots and related methods that determine whether some measured behavioral variable is out of control—i.e., giving a measure of unpredictability versus consistency, which may be highly useful in a practical implementation of a BM.

A BM may set conditions based on the local feature attributions of the input dimensions of an explainable architecture x, in an Explainable System 570. An exemplary input sample may have two inputs, in this case x and y. A feature importance vector I may represent the feature importance in a local manner such that $I = \{\beta_0, \beta_1, \ldots, \beta_n\}$, where $n = |F|$ is the total number of transformed features corresponding to the generated features F. In an exemplary embodiment, F may include $\{x,y,xy,x^2,y^2\}$. Given a specific input vector $\{x, y\}$, it may be contemplated that one or more rules may trigger through the function $f(x,y)$. In this exemplary embodiment, let $x \leq 10$. This may trigger the function Sigmoid$(\beta_0+\beta_1 x+\beta_2 y+\beta_3 xy)$, which results in the localized feature importance vector $I_L=\{\beta_1 x, \beta_2 y, \beta_3 xy\}$. In an exemplary embodiment, a condition $BM_c$ may be set on the feature importance vector in order to trigger a bias warning to the interpreter of the behavioral model.

The underlying explainable architecture x may contain a separate behavioral model $x_{BM}$ that is utilized during training, specifically during the backpropagation phase. The behavioral model $x_{BM}$ may be separate from the behavior model BM that is used on the deployed explainable architecture. Hence, $x_{BM}$ designed for backpropagation mode may include separate conditions, events, triggers, and actions.

A BM may contain multiple explainable architectures $BM_x$, such that $BM_x \in \{x_1, \ldots, x_n\}$. The architectures $BM_x$ may share conditions c, triggers t, actions a and events e. In this exemplary case, there might exist some conditions, triggers, actions, and events in $x_1$ and $x_2$ that are the same, referred to as "identical" in the formula, as shown in Equation 5, Equation 6, Equation 7 and Equation 8.

$$(x1,x2) \in BM_x, \exists k \in x1_c, \exists u \in x2_c : \text{identical}(k,u) \quad (5)$$

$$(x1,x2) \in BM_x, \exists k \in x1_t, \exists u \in x2_t : \text{identical}(k,u) \quad (6)$$

$$(x1,x2) \in BM_x, \exists k \in x1_a, \exists u \in x2_a : \text{identical}(k,u) \quad (7)$$

$$(x1,x2) \in BM_x, \exists k \in x1_e, \exists u \in x2_e : \text{identical}(k,u) \quad (8)$$

A named reference label may be assigned to particular components within an explainable model and/or a behavioural model. Named reference labels may be descriptive in nature and may also contain additional meta-data and links to external taxonomies, ontologies, and models. A named reference label may consist of symbolic expressions and/or formulas of the form of conjunctive normal form (CNF), or disjunctive normal form (DNF), or a suitable first order logic, to provide an explanation of the set or sequence of decisions that resulted in the execution of the current component, in the behavioral model BM, which we refer to as the path trace. An "activation path" may be defined as a data flow path followed by an AI model, starting from a particular input, and ending in a particular output prediction. The path trace is set or sequence of decisions, nodes, transitions, or applicable description structures for the particular AI model describing the activation path. Named references may be used in safety related constraints to ensure easier and more reliable identification by humans, especially in potentially critical and stressful situations where human attention span may be severely taxed or limited.

In an exemplary embodiment, named reference labels may contain meta-data about multimedia files associated with that named reference label, units and dimensions associated with the explainable model component, and so on. The named reference label itself is a direct form of symbolic reference, that can either be the named reference label text itself or an associated meta-data.

In an exemplary embodiment, the named reference labels themselves may also be used by a suitable model discovery system or model optimization system, such as an exemplary AutoXAI system (that in this case, may discover and optimize BMs), to generate human-friendly explanations of BM related or other dynamical processes that may be otherwise very difficult to explain. It may be further contemplated, the named reference labels may remain invariant throughout such dynamical processes, even though the precise location, connection and relationship between the part and the whole of the relevant named component may change. Such invariance under dynamical processes makes named reference labels an ideal component for use within explanations.

In another exemplary embodiment, the same invariance of named reference labels under dynamical processes may be utilised by a BM to generate stable, long-term explanations of the dynamics occurring within an AI model without having to recode knowledge or retrain explanatory methods with each run of the dynamical process.

Any BMs associated with AI models that have had structural changes may need to update their dynamic explanations of the model's new behaviour, and undergo several consistency checks related to both the addition and deletion, and in general, modifications to the underlying AI model.

The novel use of named reference labels in an exemplary embodiment within behavioural models and their association with evolving AI models that have been modified using a suitable dynamical process, such as AutoXAI, model discovery, or model optimization process, may enable a practical implementation of neuro-symbolic constraints that may apply to some up-stream meta-reasoning layer that has access to the statistical or causal relationships between variables.

Named reference labels may also be used to integrate explainable AI models and BMs with neuro-symbolic AI systems that can utilise symbolic rule expressions and be used to perform automated symbolic checks and verification that is impossible to do with a black-box AI system. The combination of a white-box AI system and a BM is particularly powerful, as it allows end-to-end understanding of the functioning of the AI system together with prediction and control of its behaviour. Furthermore, this combination allows for both static verification and logical boundary-type checks of the AI system and the BM, together with dynamic checks, monitoring and verification of the AI system and the BM.

A number of events, triggers, constraints, and actions in a BM or BMH may be deemed to be important or critical for the particular application domain. Such importance may be determined either by the application or usage context, or via an external third party, such as a regulatory or legal authority or an industry standard making body, that imposes certain mandatory constraints. These type of important or critical constraints may be referred to as anchor events, anchor triggers, anchor constraints and anchor actions, respectively. Such anchor components are analogous to the anchor terms, anchor variables, anchor nodes and anchor edges concepts within explainable models and within Explanation Structure Models (ESMs).

A DEA may be utilized in a behavioral model framework in order to increase the performance of the defined models. A DEA may contain multiple explainable architectures $DEA_m$, such that $m \in \{x_1, x_2, \ldots, x_n\}$, where $x \in \{XAI, XNN, XTT, XRL, XSN, XMN, INN\}$ or logically equivalent or similar architectures, and these models may be processed in parallel. The number of explainable architectures 1410 in the distributed framework may be defined as $DEA_n$. FIG. 13 illustrates a high-level architecture of an exemplary distributed training system, where $DEA_m$ refers to the parallel $DEA_n$ explainable models, where $DEA_n$ is the number of models in such framework.

A DEA may split the dataset into multiple subsets 1400 of data in order to train the explainable architectures $DEA_x$.

The models trained in a DEA may be aggregated 1420 during the training phase by calculating the average (or weighted average) from the parallel models. The aggregate model may be formed based directly on the weights of the model, rather than from the result of the individual models. A DEA may be useful for large datasets where the training data cannot fit in the CPU/GPU or similar memory of a single machine.

A DEA may include hybrid models, such that the models in such architecture are a mix of x, where $x \in \{XAI, XNN, XTT, XRL, XSN, XMN, INN\}$ or logically equivalent or similar architectures. An exemplary embodiment may implement multiple different models. In an exemplary embodiment, one data part may implement an XNN while another data part of the same system may implement an XAI. The models may then be combined to create an aggregate model. The aggregate model may be equal to x, where $x \in \{XAI, XNN, XTT, XRL, XSN, XMN, INN\}$ or logically equivalent or similar architectures or may be a hybrid model implementing multiple different models. A distributed explainable architecture DEA may incorporate multiple independent models where one model, once trained, can work independently without the need to rely on the full distributed architecture, which is optimized primarily for training purposes.

Figure 14:
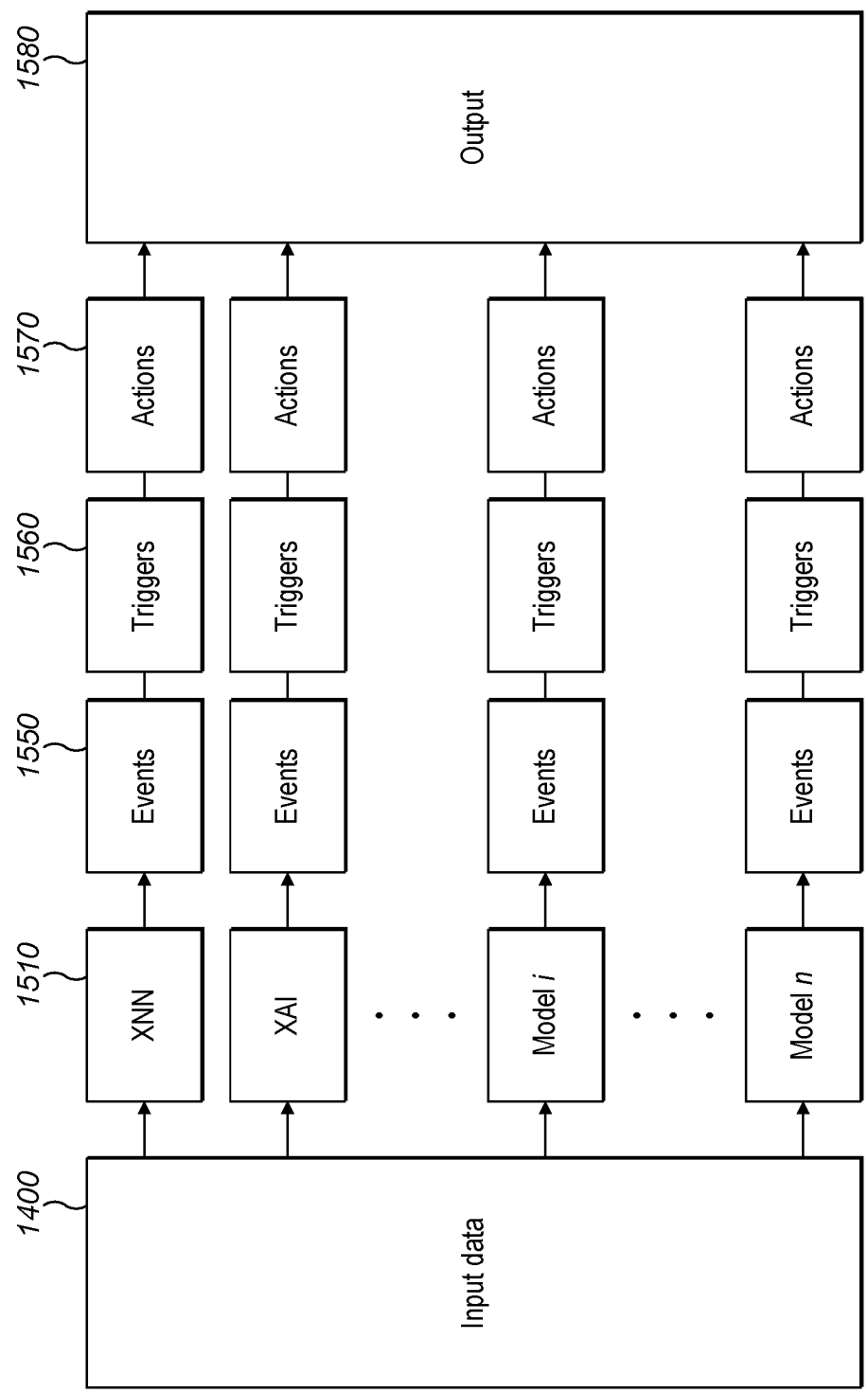
FIG. 14 is an exemplary embodiment of a feed-forward distributed architecture for events, triggers, and actions.

Conditional constraints may be set on the internal coefficients of an Explainable System 570, such as the explainable architecture x in a DEA. As illustrated in FIG. 14, a conditional constraint c may be set on a coefficient that is located in a model m, where $m \in \{XAI, XNN, XTT, XRL, XSN, XMN, INN\}$ or logically equivalent or similar architectures 1510. When such conditional constraint is set to true, an event e 1550 is fired in order to trigger 1560 an action a 1570. The action a may perform a change in the status of a sub-component 1580 within the model or raise an event e within the model. Actions $BM_a$ may be triggered by a trigger t. A BM may contain a set number of triggers $BM_t \in \{t_i, \ldots, t_n\}$. A trigger t may be activated when a condition c set for trigger, $t_c$ is set to true. A trigger t may have multiple set of conditions to be activated, such that $t_c \in \{c_1, \ldots, c_n\}$.

Figure 15:
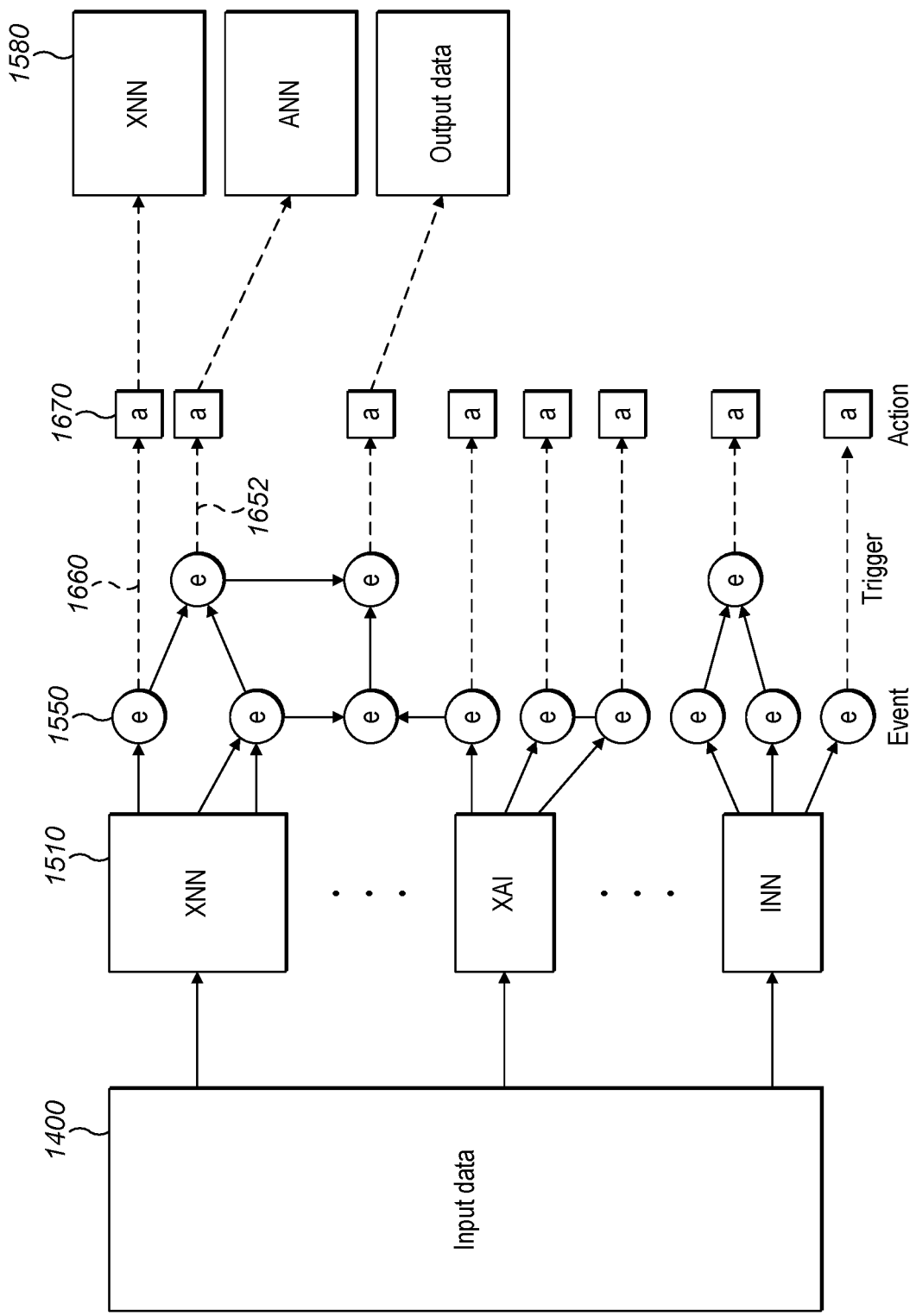
FIG. 15 is an exemplary embodiment of a feed-forward distributed architecture for events, triggers, and actions.

Referring now to the exemplary embodiment in FIG. 15, FIG. 15 may illustrate an exemplary feed-forward distributed architecture for events, triggers, and actions. In an exemplary embodiment, a distributed explainable architecture DEA may have v explainable models, such that $DEA_m$, where $m \in \{x_1, x_2, \ldots, x_v\}$ and $x \in \{XAI, XNN, XTT, XRL, XSN, XMN, INN\}$. $x_1$ may have an action a 1670 that is based on an internal trigger $x_{1,t,1}$ that is activated when the fusion of two conditional constraints 1652 $x_{1,c,1}$ and $x_{1,c,2}$ are set to true. $x_{1,t}$ may refer to the triggers defined for the explainable model $x_1$, where $t \in \{t_1, \ldots, t_n\}$. Trigger $x_{1,t,2}$ may be based on a partial constraint 1660 of trigger $x_{1,t,1}$, and the constraint being $x_{1,c,1}$. Hence, when the conditional constraints $x_{1,c,1}$ and $x_{1,c,2}$ are set to true, an event is fired to activate trigger $x_{1,t,1}$, and an additional event is fired to activate $x_{1,t,2}$. The fusion of conditional constraints may be based on multiple models m, within a distributed explainable architecture DEA to trigger the desired actions 1670 1580.

It is further contemplated that conditions, constraints, actions, triggers, and events may utilize a combination of abductive, inductive, deductive logic in conjunction with causal logic. Using inductive logic, BMs may predict future behavior based on generalized rules and knowledge that may have been learnt fully automatically. Using deductive logic, BMs may predict behavior according to a combination of one or more conditions or constraints. Using abductive logic, BMs may retrofit an observed scenario to a known set of possible states in the BM or be able to explain the currently observed behavior in a reasonably acceptable manner. Abductive logic can also be useful in practical implementations of diagnostic systems and can be used to aid in the diagnosis and troubleshooting of AI systems using behavioral monitoring and predictive data.

In an exemplary embodiment, a BM may use inductive logic to generalize safety rules and constraints to unforeseen circumstances that may still be dangerous, nonetheless. It is further contemplated that using deductive logic, the BM may augment safety constraints with logically derived conclusions from the initial set of rules or constraints. It is further contemplated that using abductive logic, the BM may use the outcomes of diagnostic and/or abductive results to refine the scope of the safety rules or constraints.

In an exemplary embodiment, BMs can also utilize multiple explainable models to fuse answers, model explanations and justifications coming from one or more models including but not limited to models hosted locally, remotely, via a number of data transmission networks, on the edge, and embedded systems, which are further deployed as a single or distributed model, or as ensembles.

In an exemplary embodiment, BMs can utilize an ensemble of explainable models or other suitable distributed system to improve performance in parallel or on suitable deployment architectures, such as cloud computing systems.

Figure 11:
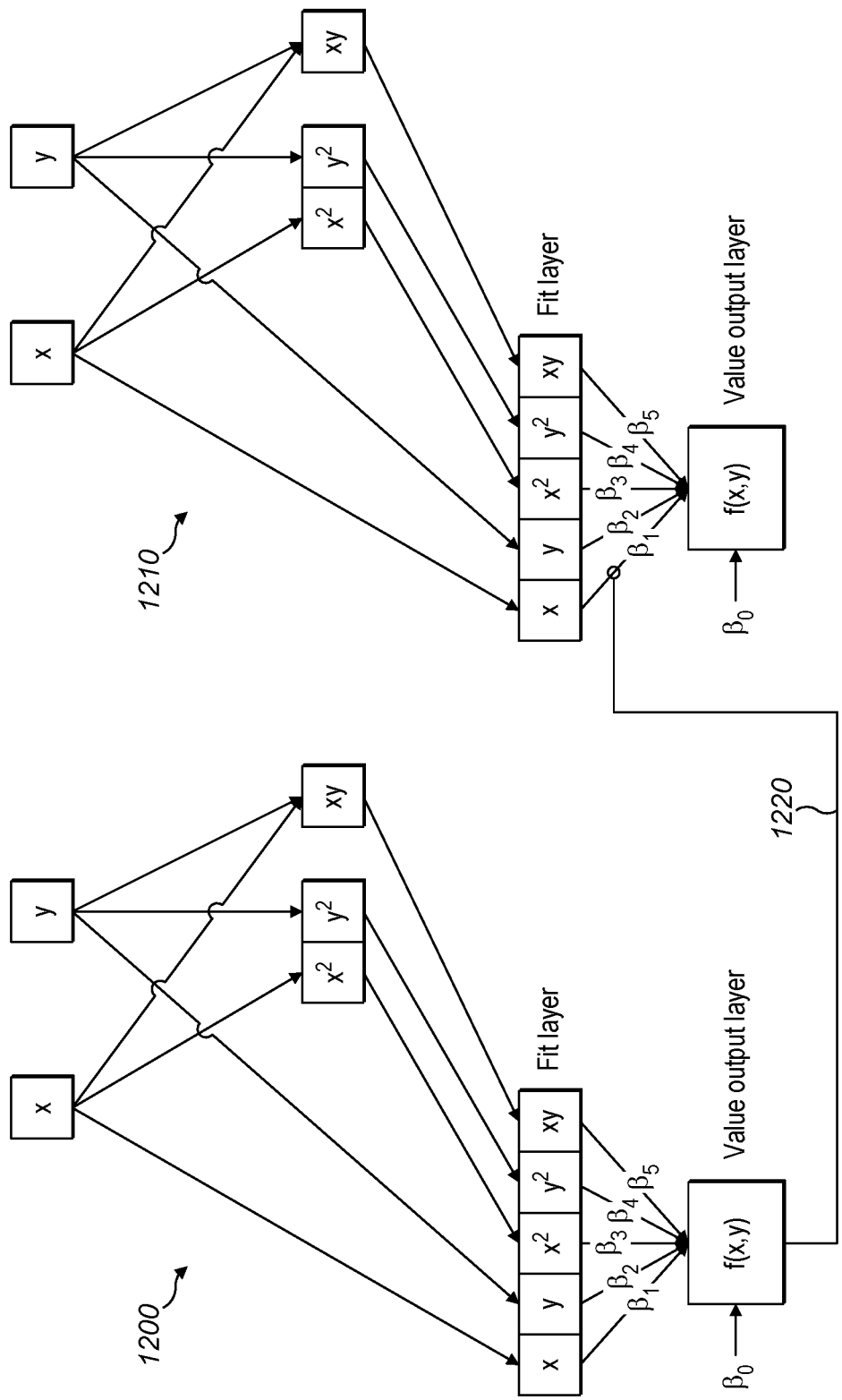
FIG. 11 is an exemplary embodiment of a fast XNN architecture.

A behavioral model BM may contain multiple explainable architectures $BM_x$, such that $BM_x \in \{x_1, \ldots, x_n\}$, and the output from a neuron node in an explainable architecture may be used to update a weight in another explainable architecture. The explainable architecture that may include weights that are updated using this approach may be a fast explainable architecture $f$, where $f \in \{F\text{-}XAI, F\text{-}XNN, F\text{-}INN, F\text{-}XTT, F\text{-}XRL\}$. A condition c in a behavioral model BM may be based on a fusion constraint of weights and the output of a node of a fast explainable architecture, as shown in FIG. 11. A condition c in a behavioral model BM may be based on a fusion of constraints that may include a weight from a fast explainable architecture and a prediction output or a coefficient from an internal part from a normal explainable architecture. A condition c in a BM may be based solely on a fast weight in a fast explainable architecture.

In an exemplary embodiment, a BM may include an XNN explainable architecture $x_1$ 1200 and a fast XNN explainable architecture $x_2$ 1210. The $x_1$ 1200 prediction output layer of the prediction network may be connected to a particular coefficient 1220 of the prediction network of a fast XNN architecture $x_2$ 1210.

Figure 12:
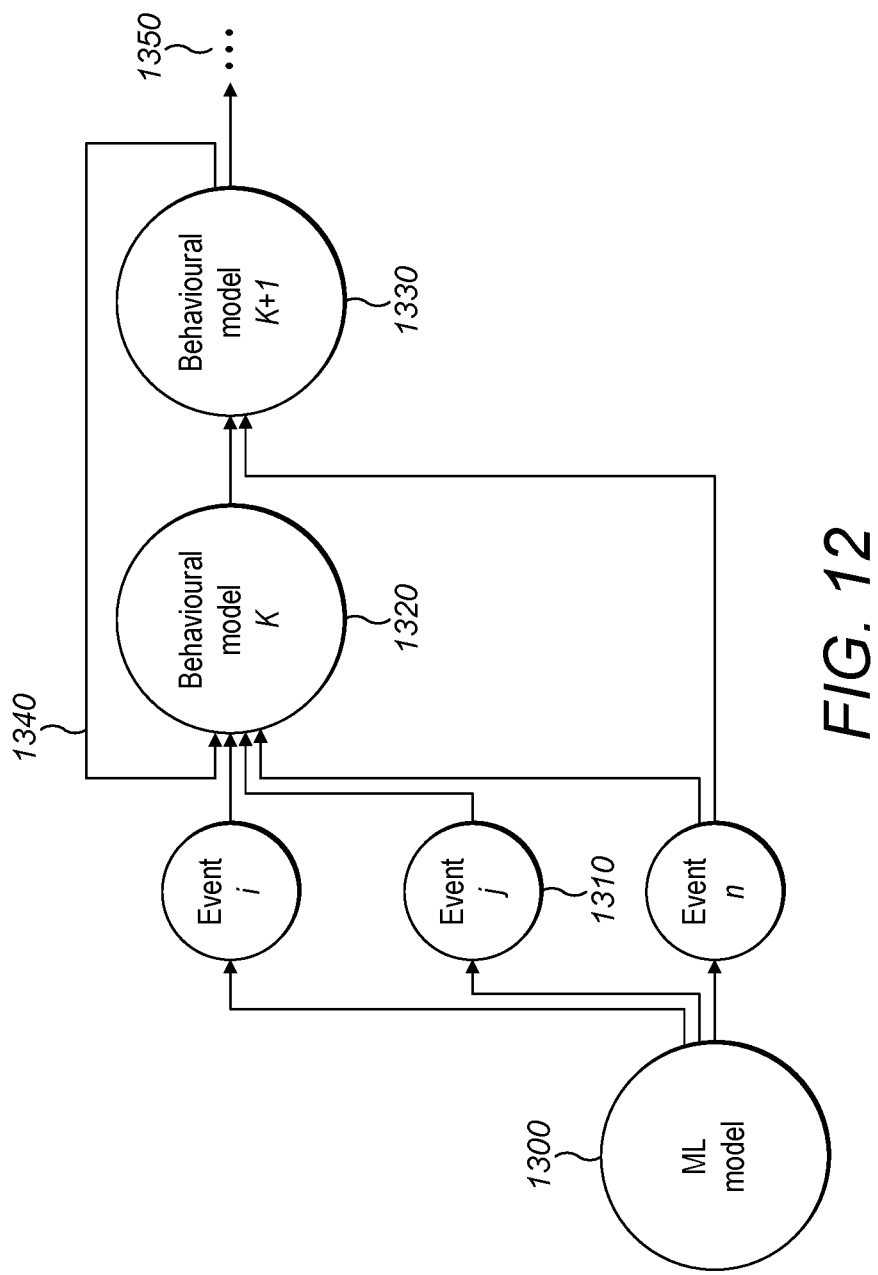
FIG. 12 is an exemplary embodiment of a Behavioral Model Hierarchy (BMH) framework.

A Behavior Model Hierarchy (BMH) is a hierarchical framework that may include two or more behavioral models. Behavioral models within a BMH may be connected to each other or connected to one or more explainable systems. BMH may be used to maintain scalability and create re-usable components, as shown in FIG. 12. BMH may include super-states $BMH_s$ that communicate between its behavioral models $BMH_{BM}$ 1320 1330 and generalized transitions 1340 to transition between such behavioral models $BMH_{BM}$. Super-states $BMH_s$ are a group of states that are utilized to prevent redundant transitions between normal states. Transitions between super-states $BMH_s$ are referred to generalized transitions. BMH may utilize attributions and information, that is retrieved from internal states of such explainable architectures or from the output of the computation from such explainable architectures, to update the state of a super-state. Output may include any related meta information of the explainable architectures or logically equivalent or similar architectures 1300. A Behavior Model Hierarchy BMH may also combine events e 1310, actions a, and triggers t from multiple behavioral models $BMH_{BM}$ in order to achieve a certain objective. Output 1350 may refer to the output, actions a, events e and triggers t activated from the behavioral model $BM_{k+1}$ 1330. A BMH may be defined as acyclic BMH or cyclical BMH. Cyclical BMH may refer to a BMH which may include feedback actions from a behavioral model BM to another behavioral model BM within Behavior Model Hierarchy BMH. Acyclic BMH may refer to a BMH that does not contain feedback action loops between behavioral models $BMH_{BM}$.

In an exemplary embodiment, an autonomous system may be designed using a BMH. A BMH may include multiple behavioral models $BMH_{BM}$, where $BMH_{BM} \in \{BM_1, \ldots, BM_n\}$. A BMH may include a machine learning model that is utilized by multiple behavioral models. An exemplary autonomous system may have conditional constraints $BMH_c$ on the white-box machine learning model. The activation of conditions $BMH_c$ fire events $BMH_e$ to triggers $BMH_t$ that may be connected in multiple behavioral models $BM_K$ and $BM_{k+1}$. The triggers $BMH_t$ may provide feedback actions $BMH_{af}$ to the machine learning model or terminal actions in behavioral model $BMH_{at}$. An exemplary autonomous system using a BMH may include multiple machine learning models $BMH_x$, where $BMH_x \in \{x_1, \ldots, x_n\}$. In this exemplary case, conditions of Behavior Model Hierarchy BMH may be fused together as a conditional requirement for a particular trigger in $BMH_t$.

A BM or a BMH may require verification against a specification of the desired behavior before being deployed in a system that requires a safety assurance. A model that achieved high accuracy might not become formally verified, since accuracy does not illustrate how much of the internal logic was tested when validating the model on the unseen dataset. Machine learning models may have blind spots for adversarial perturbations (Goodfellow et al., 2014). An adversarial perturbation may represent input observations that are formed by applying small but specific perturbations to observations that are utilized for prediction on the respective machine learning model. A BM may allow for triggers 530, events 520, actions 550 540 and system components 560 to be based on coefficients, output or other neuro-symbolic information contained in the white-box explainable models (as shown in FIG. 4), in order to handle unexpected prediction results, such as adversarial perturbations (Goodfellow et al., 2014) and take appropriate actions that preserve safety, while allowing the BM to be adaptable to unforeseen circumstances. In an exemplary embodiment, a BM may be used to investigate an unexpected prediction by analyzing the feature attributions of the input space for global and local bias.

Formal verification may verify the output of a model under specific conditions, in order to avoid costly mistakes. In an exemplary embodiment, an autonomous vehicle system may be required to verify that an output action for certain conditions must always be the same in order to avoid fatal accidents. Hence, a BM or BMH may need to be formally verified for particular specifications to ensure the decision of the model when the model is deployed.

A BM that may include a deep learning model may be formally verified using techniques such as Reluplex (Katz et al., 2017) to verify the model for particular conditions on the input dataset and the output value, in order to ensure that the conditions are satisfiable for the model. Conditions c for black-box models may include constraints on the input dimensions and the output dimensions of the model.

In another exemplary embodiment, a BM may be implemented using neuromorphic hardware. The conditions, events, triggers, and actions of a BM may also run entirely natively on appropriate neuromorphic hardware. Explainable models, such as XNNs, that can also run natively on neuromorphic architectures can be seamlessly associated and linked with a BM entirely on neuromorphic hardware. Such an exemplary embodiment may provide a practical solution for behavioral monitoring, assessment, identification, prediction, and control of neuromorphic devices in a controlled, reliable, and replicable manner while ensuring safety and adequate control and human oversight of neuromorphic systems.

In another exemplary embodiment, a BM may be implemented using a quantum processing system. It is contemplated that an BM implemented on a quantum processing system will have characteristics that are similar to classical BM models with the addition of quantum specific extensions. For example, such an extension may allow for the specification of quantum annealing effects and their correct interpretation. In another example, an extension may allow for the correct interpretation of multiple qubit states, qubit basis states, mixed states, Ancilla bits, and other relevant quantum effects due to entanglement and/or decoherence. In another example, an extension may allow for the introduction of quantum logic specific operators and/or hardware logic gates within an XNN, such as quantum logic gates like CNOT (Controlled-NOT), CSWAP (Controlled-Swap or Fredkin gate), XX (Ising Coupling Gate XX), YY (Ising Coupling Gate YY), ZZ (Ising Coupling Gate ZZ) gates, Pauli gates, Hadamard gates, Toffoli gates and other relevant quantum logic operations that may be combined serially or in parallel. Such quantum-logic gates (or quantum gates) operate on a number of qubits, acting as the quantum analogy of classical logic gates. The XX, YY, ZZ designation of the Ising gates are related to the Pauli X, Y, Z matrices which are used to describe the interaction of a particle's spin with an external electromagnetic field. Furthering these examples, such quantum specific extensions may be implemented in various parts of the BM system, for example by having quantum extended versions of conditions, events, triggers, and actions. It is further contemplated that such quantum extended versions of a BM may take advantage of quantum effects, for example, to execute multiple actions, or evaluate multiple conditions, or evaluate large systems of constraints in significantly fewer processing steps needed than possible on a classic processing implementation.

Quantum Causal BMs can model quantum decoherence effects and the inherent uncertainties involved in quantum measurement. In such a Quantum BM, there may be multiple outcomes instead of a single outcome for a Classical BM. Similarly, a Quantum EBM may have multiple expected outcomes instead of single outcomes in a Classical EBM. In a Quantum BM, the OBM represents the measurement, and hence collapse of quantum states, and will thus represent similar information to a Classical OBM, although the actual results may be different due to the use of quantum logic operations. A Quantum BM thus represents a practical way of monitoring, identifying, assessing, predicting, and controlling the behaviour of a quantum AI model running on quantum computing device. Safety applications of Quantum BMs may take advantage of this by speeding up constraint satisfaction searches and by considering multiple predicted outcomes faster than what can be done with a Classical BM.

Given the real-time nature of applications for BMs, the temporal reduction and performance increase given by Quantum BMs may be highly beneficial.

In an exemplary embodiment, a Quantum BM may utilize suitable quantum algorithms, such as those based on quantum Fourier transforms, amplitude amplification, quantum walks and so on. In an exemplary Quantum BM embodiment, the Bernstein-Vazirani, Simon's algorithm or the Deutsch-Jozsa algorithm is utilized to predict and refine the boundary conditions of the EBM. In another exemplary Quantum BM embodiment, Shor's algorithm, Quantum Phase estimation algorithm, Grover's algorithm, Quantum Counting, Quantum Hamiltonian NAND trees, or the HHL algorithm may be used to speed up the constraint, condition, event, and trigger parts of Quantum BMs. In another exemplary Quantum BM embodiment, a hybrid solution may be utilized, such as the QAOA algorithm, VQE eingensolver, CQE eingensolver, and quantum matrix inversion to speed up part of the processes involved, for example by using Gaussian estimation processes, or linear system of equations solvers that utilize quantum processing to give faster results.

In another exemplary embodiment, a BM may be used in conjunction with AI models that process sequence data. Sequence data may include data points which contain feature data in various sequential formats including, but not limited to: 2D data, 3D data, multi-dimensional data arrays, transactional data, time series, digitised samples, sensor data, image data, hyper-spectral data, natural language text, video data, audio data, haptic data, LIDAR data, RADAR data, SONAR data, and logically equivalent or similar sequential formats. Data points may have one or more associated labels which may indicate the output value or classification for a specific data point or a continuous or non-continuous interval of data points. Data point sequences may result from an internal and/or external process that may output a combination of synthetic data points, perturbed data, sampled data, or transformed data. Such data point sequences may be the input for BM constraint expressions, conditions, events, triggers, and actions.

In an exemplary embodiment, a BM may be used to implement formal verification of an autonomous system to detect nearby pedestrians may be described using constraints and/or rules such as "if a pedestrian is near the autonomous system; and such pedestrian is coming from the left, perform a right turn". An automated constraint and/or rule augmentation system may augment the verification statement by additional background rules adopted from the world context, for example, by adding "where such turn is determined by the system speed, predicted pedestrian speed and right-hand obstacle boundaries". Such a verification problem can be converted into a solvable system of equations, with parameters such as the distance between the autonomous system and the pedestrian, D, given $dist_l < D < dist_u$, where $dist_l$ and $dist_u$ are the lower and upper boundaries of such distance, and at angle θ, given $ang_l < \theta < ang_u$, where $ang_l$ and $ang_u$ are the lower and upper boundaries of the angle of the predicted pedestrian movement vector. Formal verification techniques may be utilized to verify that with such parameter constraints, the prediction output for the right turn angle needs to be within boundaries $o_{lower} < right_{turn} < o_{upper}$. Furthering the example, such formal verification solutions may also be implemented in parallel with those based on observational, dynamic verification of actual observed behavior, in this case, running on the autonomous system itself. Continuing with the example, the autonomous system may also output an explanation at a user-level like "Had to swerve strongly to the right to avoid the pedestrian who ran in front of the car". Adjectives in the explanation, such as "strongly" can be determined via some appropriate classification method, value lookup table, fuzzy logic system, AI model or other appropriate text generation implementation. The autonomous system may also output more detailed explanations, for example, at a diagnostic-level like "Car swerved strongly to the right (acceleration profile: angle=20°, speed delta=2.77 m/s) to avoid pedestrian (detected object: class=pedestrian, confidence=95%; object vector (predicted): relative degree=90°, relative speed delta=2.22 m/s) collision (predicted collision=91%; predicted injury risk=HIGH; predicted vehicle component=front headlamp)". The autonomous system may also utilize the diagnostic-level explanation, encoded in a suitable format, such as a machine-readable method for encoding and transmitting XAI knowledge, to produce multimedia output, such as an animation on a suitable dashboard display or heads up display system or augmented reality display. It is further contemplated that such information may also be transmitted over an appropriate Intelligent Transport System (ITS) network, such as a vehicle to vehicle (V2V) network, vehicular ad hoc network (VANET), mobile ad hoc network (MANET) using an appropriate inter-vehicle communications (IVC) protocol such as an IEEE 802.11p compatible protocol.

A BM may include an explainable architecture $BM_x$, where $x \in \{XAI, XNN, XTT, XRL, XSN, XMN, INN\}$ or logically equivalent or similar architectures. An exemplary embodiment enables formal verification constraints to be set on the output or internal parts of such explainable architecture $BM_x$. The output may include feature attributions for the input dimensions of the observation and partition information for such observation. Internal parts of explainable architecture $BM_x$ may include coefficients of the local model for observation.

The execution sequence es of the behavioral model BM may refer to the execution trace routed by the behavioral model transition function between the defined Explainable System component 570 and other components of the behavioral model BM. An execution sequence is unique if the behavioral model BM is a deterministic model. An execution sequence is not unique if the behavioral model BM is a non-deterministic model.

In the case of non-deterministic behavioral model, where the sequence is not unique, when the same input is used for the behavioral model multiple execution traces are generated. Let input dimensions be defined as input_d, hence in a non-deterministic behavioral model, $es_{input\_d} = \{es_1, \ldots, es_n\}$. An exemplary embodiment enables conditions BM, to be set on the execution sequences $es_{input\_d}$, such that events $BM_e$ are fired to trigger an action a if conditions $BM_c$ are true. In an exemplary embodiment, a system may rank the execution sequences $es_{input\_d}$ for the same input dimensions, according to the probability likelihood of encountering the execution sequence in the model.

In an exemplary embodiment of a non-deterministic behavioral model in an industrial robotics application, for example, using a manufacturing tool held by a robotic arm, a ranked sequence of possible robotic arm locations may be generated by the behavioral model and more intense warnings may be issued if a human operator strays closer to a possible collision path with the robotic arm. If an imminent collision is predicted to happen with a high probability, a temporary pause or emergency halt event may also be triggered to escalate the safety mechanism. It may be contemplated that such an embodiment may also be implemented entirely in hardware for faster performance, for example, by utilizing an optimized XNN together with a Petri net-based BM that have been output as a dedicated hardware circuit. Further, it may be contemplated that such hardware embodiments may form part of the control engineering circuitry of robotic machinery, appliances, and the like that may require real-world interaction and control in a verifiable, certifiable, risk minimized, and safety assured manner.

An exemplary behavioral model may store the probability likelihood information for its respective execution sequences es, known as probabilistic execution sequences. A behavioral specification of a behavioral model BM may include a set of initial states and the respective execution traces. A behavioral specification may have complete coverage of all possible execution traces or at least partial coverage if it does not include all possible execution traces.

In an exemplary embodiment, behavioral model $BM_1$ has the behavioral specification $SBM_1$ and behavioral model $BM_2$ has the behavioral specification $SBM_2$. The difference between the execution traces of $BM_1$ and $BM_2$ is defined as $\xi(SBM_1, SBM_2)$. The difference $\xi(SBM_1, SBM_2)$ include execution sequences es, where es=$\{es_1, \ldots, es_n\}$, that are not identical in $SBM_1$ and $SBM_2$.

The difference $(SBM_1, SBM_2)$ between the behavioral specification $SBM_1$ of a probabilistic behavioral model $BM_1$ and the behavioral specification $SBM_2$ of non-probabilistic behavioral model $BM_2$ may be computed by discarding the probabilistic information of $BM_1$ and compare the execution sequences es without using the probabilistic information.

The difference between the behavioral specification $SBM_1$ of a probabilistic behavioral model $BM_1$ and the behavioral specification $SBM_2$ of probabilistic behavioral model $BM_2$ is defined as $\xi_p(SBM_1, SBM_2)$. The difference $\xi_p(SBM_1, SBM_2)$ may include the probabilistic information of the execution sequences es, where es=$\{es_1, \ldots, es_n\}$. The difference $\xi_p(SBM_1, SBM_2)$ may be calculated using a suitable difference method such as subtraction between the probability likelihoods of execution sequences es.

An exemplary embodiment may enable conditions of a behavioral model hierarchy $BMH_c$ to contain constraints on the difference between the behavioral specification $SBM_1$ of behavioral model $BM_1$ and the behavioral specification $SBM_2$ of behavioral model $BM_2$. In an exemplary embodiment, the behavioral model hierarchy conditions $BMH_c$ may be based on a threshold th, where threshold th refers to the probability likelihood difference between execution sequences es.

In an exemplary embodiment, an autonomous vehicle system may be based on a BMH. A BMH may include behavioral models $BMH_{BM} \in \{BM_1, \ldots, BM_i\}$. An exemplary system may include conditional constraints $BMH_c$ such that the difference $\xi_p(SEBM_1\ SOBM_1)$ between the behavioral specification of the expected behavioral model $EBM_1$ and the behavioral specification of the observed behavioral model $OBM_1$ may be used to monitor for deviations between the expected behavioral model $EBM_1$ and the empirical observations in execution sequences es of the observed behavioral model $OBM_1$.

In an exemplary embodiment, BMs may be used to do constant monitoring of AI models to detect anomalous behavior, detect instances of data drift and OOD instances, analyze and assess the behavior of AI models under OOD and anomalous instances, variation, deviation, performance and resource usage monitoring, phase-space, and other related monitoring activities. BMs may also perform continuous certification of the associated AI model, with an optional confidence/error interval, according to various criteria and raise an action when the certification is in danger of being revoked.

An exemplary embodiment may assure the safety in the data management stage of an exemplary machine learning lifecycle (Ashmore et al., 2019) through the underlying explainability architecture. The autonomous system may verify that the data is relevant to the task by analyzing the patterns of the feature attributions of the input of the training dataset, the partitioning information of the explainable architecture, and the prediction data. A threshold could be utilized to monitor the difference of the feature attributions between different inputs. A flag may be raised in the system if the difference exceeds the defined threshold. A threshold could be utilized to monitor the output of a function $f$, where $f$ may be the count of the number of observations in each partition of the explainable architecture. If the threshold is exceeded on an unseen dataset, a flag may be raised in the system. It may be contemplated that a confidence interval or some other form of probability scoring metric is associated with the threshold, adding discrete or continuous threshold levels to an implemented system.

In an exemplary embodiment, a BM may be constructed to review the health of the patients of a particular hospital. An explainable architecture may be trained to measure the health of the patients using a Complete Blood Count (CBC) blood test dataset. The BM may have conditional constraints BM, that are set on the explainable white-box architecture $BM_x$, where $x \in \{XAI, XNN, XTT, XRL, XSN, XMN, INN\}$ or logically equivalent or similar architectures. The conditional constraints BM, may be set to monitor the feature attributions of the input features on unseen dataset and compare it with the feature attributions of the training dataset or other defined dataset. A function $f$ may be utilized to measure the difference between the feature attributions on the unseen dataset and on the training or defined dataset. The explainable architecture $BM_x$ is trained on patients ongoing medical treatment A. A medical professional, using the explainable architecture $BM_x$, predicts an unseen CBC blood tests dataset of patients ongoing a different medical treatment B. If the behavioral model conditional constraints BM, are activated, a warning is raised in the system using events $BM_e$, triggers $BM_t$ and actions $BM_a$. In an exemplary embodiment, a warning may be presented to the medical professional stating that the dataset inserted for prediction might not represent patients that are ongoing the same medical treatment as the dataset utilized for training $BM_x$.

An exemplary embodiment may assure the safety in the model learning stage and model verification stage, since an exemplary explainable architecture may also be interpretable, re-usable and validated on the selected machine learning algorithm. An exemplary embodiment provides multiple levels of explanations: basic interpretation, explanatory interpretation, meta-explanatory interpretation.

An exemplary embodiment may be reusable and can be combined with additional models to achieve the desired objective while retaining the model explainability. The coefficients of the underlying explainable architecture may be visible to the system, allowing for human knowledge injection and system knowledge injection, and thus may offer an increase in the safety and assurance of an autonomous or semi-autonomous system that is using the behavioural model framework BM. Further interpretation and insights may be gained via human inspection of the results, the explanation, justification, and the meta-explanation, leading to more effective collaboration between human users and the AI system.

Model reusability may be seen where the underlying explainable architecture is integrated within autoencoders and Convolutional Neural Network (CNN) architectures and CNN-XNN and Backmap, where the underlying explainable architecture is integrated within a CNN architecture. Model reusability may be found in the latent layer of an explainable autoencoder (XAE) which may be used to condition the samples of the generator on multiple criteria according to the input layer of the XAE, in an explainable generative adversarial network (XGAN). An exemplary embodiment may be validated using performance metrics such as precision, recall, AUC, AUC (PR) or accuracy, depending on the task of the machine learning model. A generalization error threshold may be set. In an exemplary embodiment, if the error threshold violates the expected performance criteria established by the behavioral model the process may raise a warning or return to the data management stage. It may be contemplated that a confidence interval or some other form of probability scoring metric is associated with the threshold, adding discrete or continuous threshold levels to an implemented system. Formal verification may be utilized to check if the trained model complies with a set of formal properties, such as a mathematical proof.

In an exemplary embodiment, a behavioral model is constructed to generate realistic blood test data of patients with a particular medical condition. An XGAN may be trained to create realistic blood test data. An XAE is trained, using the conditional feature constraints as input, and the latent layer is used as an input vector to the XGAN architecture to condition the type of blood test samples generated by the generator. The feature attributions generated for the explainable generator XG may be backtracked, using an appropriate method such as the backmap or suitable alternative, to the input of the XAE. The feature attributions generated by the XAE may be compared with the backtracked feature attributions of the XG architecture using a function $f$ in order to identify patterns between the conditional constraint latent compression and the resultant conditioned samples. Such identified patterns are linked to the behavioural model, allowing for formal verification techniques to be utilized to prove the correctness of certain formal specification with respect to the input conditional constraints of the autoencoder. It is further contemplated that such a behavioural model solution may allow formal verification techniques, such as Reluplex (Katz et al., 2017) and other suitable techniques, to be utilized to verify the correctness of the given formal specification.

Ashmore et al. (2019) argued that an autonomous system must be programmed to handle unexpected prediction results from a machine learning model. An exemplary embodiment may consist of assuring the safety of a deployed white-box model within an autonomous or semi-autonomous system. A behavioural model may allow for triggers 530, events 520, actions 550 540 and system components 560 to be based on the coefficients of the white-box machine learning models, in order to handle unexpected prediction results from the respective white-box machine learning models, and in a critical case, use a terminate action. As shown in FIG. 4, this allows the behavioural model to be adaptable according to the output or internal coefficients of the white-box machine learning models. An exemplary embodiment may investigate an unexpected prediction by analyzing the feature attributions of the input space for global and local bias.

A method for classifying black-box model output, for triaging failure events of autonomous systems is presented in (Zhou, 2018). Zhou does not provide any interpretation of the classified output, as it does not utilize white-box explainable models. In our work, a behavioural model BM that is used for triaging failure events of autonomous systems may provide three types of model interpretation for the classified output of triaging failure events of autonomous systems. The explainable model used in the BM, may provide three types of model interpretation: basic interpretation, explanatory interpretation, and meta-explanatory interpretation. A basic interpretation may refer to a prediction output o that can be understood by the sub-component. An explanatory interpretation may be represented by a 2-tuple vector <o, w> and may refer to a prediction output o combined with a model explanation w for the predicted value, that can be understood by the sub-component. A model explanation may include coefficients θ of the explainable architecture x that may be utilized to explain the feature importance of the input features for a given observation. A meta-explanatory interpretation may be represented by a 3-tuple vector <o, w, j> and may contain the prediction output o, the model explanation w and justification of the model explanation j. The model justification j may provide additional information about the assumptions, processes and decisions taken by the explanation system that were taken into consideration to produce the model explanation.

In an exemplary embodiment, a first vehicle failure event experienced by a first autonomous vehicle at a location has been classified by a white-box model, a second autonomous vehicle can be directed to the location. The second autonomous vehicle may attempt to recreate a similar driving scenario as to that which resulted in the first vehicle failure event experienced by the first autonomous vehicle. Vehicle data collected by the second autonomous vehicle at the location may be classified using the white-box model and if a different failure type classification is provided for the vehicle data from the second autonomous vehicle relative to the first autonomous vehicle, then a human understandable interpretation of the cause may be generated, from the explanation of the white-box model, using an interpretation filter. This contrasts with the work in (Zhou, 2018), where if the classified output of the second autonomous vehicle differs from the first autonomous vehicle, it is assumed, without any explanation or justification, that the issue that led to the first vehicle failure event is isolated and/or specific to the first autonomous vehicle. Additionally, our BM may help generate a complete causal explanation, which is missing from the work in (Zhou, 2018).

Haynes et al. (2019) illustrate a method that uses black-box machine learning models, such as static object classifiers, to predict the future locations of objects that are perceived by autonomous vehicles, without providing an explanation or interpretation of the predicted output. In this work, a behavioural model BM that utilizes explainable architectures to predict the future locations of objects that are perceived by autonomous vehicles may provide three types of model interpretation for the predicted output: a basic interpretation, explanatory interpretation, and meta-explanatory interpretation as previously disclosed above. Such explanations generated by BMs may make all the difference between a trustworthy AI system (one that can explain the underlying processes and steps taken regarding the predictions of objects) and an opaque non-trustworthy AI system (one that cannot explain, such as in Haynes et al.) in a practical implementation.

Ashmore et al. (2019) argued that a generated ML model needs to exhibit an interpretable key property in domains where assurance is required. Ashmore et al. (2019) further argued that the generated ML model may need to be interpretable in order to be considered safe, where interpretability in this case may be seen via three main viewpoints: (i.) model interpretability, which is a measure of how interpretable is a model, together with its sub-components, structure and behavior; (ii.) output interpretability, which is a measure of how interpretable the model's output is; and (iii.) logic interpretability, which is a measure of the optimality and correctness of the input-output relationship in a model (based on the model's decision or choice). The model should be capable of outputting decisions it took to arrive at an output. Interpretable models allow for justification of the results generated by the machine learning model and provide evidence for the output. Behavioural models may provide three types of model interpretation for the predicted output: basic interpretation, explanatory interpretation, and meta-explanatory interpretation, as previously disclosed above. These three types of interpretation meet the full criteria set forth in (Ashmore et al., 2019), making this work suitable for practical implementations in application domains where assurance is required.

A Behavioral Model (BM) or Behavior Model Hierarchy (BMH) may be implemented in Industry 4.0 automation systems, enabling smart factories to implement an explainable behavioral workflow based on white-box models to ensure the safety of its operations in case of an abnormal event or unexpected results from a white-box machine learning model. In an exemplary embodiment, a Behavioral Model is used for a Supervisory Control and Data Acquisition (SCADA) system to generate explainable decisions and communicate any system issues to the operator, using the generated explanations to help mitigate downtime of the system. The operator may then pause the operation and view the generated explanations using a human-machine interface (HMI) to understand the cause of the issue, enabling the operator to act immediately on the explanations, that may include information on the conditional constraints placed in the internal structure of an explainable system 570, to prevent further loss of the product. In an alternative exemplary embodiment, where the SCADA system is using black-box models in its operations, the operator may require additional time to understand why a certain erroneous output is being produced, and it might not always be possible to arrive to an explainable conclusion, when using black-box models in a system.

An observed behavioral model (OBM) consists of the base BM together with the path traces that are observed during actual operation of the BM, including any out of distribution (OOD) data that takes the BM into an operational space that was not part of the original training space. An OBM may contain a mix of frequently executed paths and paths that are executed only occasionally. A BM may contain the predicted boundaries of the model associated with the BM. An OBM may contain actual boundaries of the model associated with the BM. It is contemplated that OBM actual boundary information may be utilized to update the BM predicted boundaries. It is further contemplated that OBM actual boundary information may be utilized to update EBM predicted boundaries. The predicted boundaries may refer to, but not limited to, a sub-component output of an explainable architecture x, where x∈{XAI, XNN, XTT, XRL, XSN, XMN, INN} or similar logically equivalent architectures. The predicted boundaries may also refer to a suitable transformation in an appropriate input-output space, logically equivalent, topologically equivalent or phase-space equivalent space based on the output of an AI model associated with the BM. An OBM may identify non-optimal areas due to the uncertainty in the associated model behavior. The identification and eventual assessment of these non-optimal areas may be optimized by fine-tuning the predicted model boundaries. A narrow gap between the predicted model boundary and the actual model boundary may indicate good understanding and good fit of the BM. A BM may also potentially cover future predicted operational spaces and behavior for the associated model for transactions and data that have not been observed yet. Such not-yet-observed areas are also referred to as Out-Of-Distribution (OOD) areas and are the focus of problems related to Zero-Shot, One-Shot and Few-Shot Learning. BMs may aid in the development of such systems by aiding in the identification of potential behavior that has not yet been encountered or observed during actual operation of the associated model. A BM may also contain underspecified areas due to lack of model coverage. Neuro-symbolic symbols may help assure safety in underspecified areas, by setting neuro-symbolic conditional constraints on the boundary of the global model. Weakness in the dataset may result in a limited amount of information available, from the model path traces, or other forms of associated model information, in the construction of the BM predicted model boundaries, leading to incomplete coverage. The BM may also contain areas that correspond to dangerous or disallowed areas. Neuro-symbolic symbols may assure the safety in dangerous or disallowed areas by creating neuro-symbolic constraints on the predicted boundaries. The impact of each node in the behavioral model may be calculated as the cumulative combination of the multiple criteria measures that are applicable to the respective node and its successor nodes (i.e., all possible child node path until the leaf nodes), of the behavioral model. This impact can be calculated for both tree and graph structures, enabling BMs to be applicable to both standard and graph explainable models, including XNNs with n-ary tree like partition hierarchies and XNNs with graph-like partition hierarchies. The combination of multiple criteria measures is based on the objective of the behavioral model.

In an exemplary embodiment, a BM may have multiple criteria measures based on model performance, bias reduction, and risk management. The combination of multiple criteria measures may be normalized by expressing the total paths from the root as 1 and the rest of the paths as a fraction of the total score bounded between [0 . . . 1]. It is contemplated that a node discovery process in a behavioral model may use game theory to discover the optimal nodes for the selected combination of criteria measures. It is further contemplated that alternative methods such as Multiple Objective Optimization (MOO), Pareto Front Methods, Particle Swarm Optimization (PSO), Genetic Algorithms (GA), Bayesian Optimization, Evolutionary Strategies, Gradient Descent techniques and Monte Carlo Simulation (MCS) may be used to discover optimal nodes for a given desired combination of criteria measures.

It may be contemplated that a behavioral model BM or hierarchy BMH may be implemented and verified by on a combination of systems based on one or more of the Temporal Logic of Actions, Abstract Machine Notation, Computation Tree Logic, and other suitable implementation methods that can formally represent modal logics, intuitionistic logics, and/or relational semantics, including but not limited to Kripke semantics and/or Alexandrov topologies.

In a further exemplary embodiment, a BM may be incorporated within a workflow system that reads from the BM and writes back to the BM, including both processing data and event data. It is further contemplated that such BM and workflow combination may be further integrated within a Robotic Process Automation (RPA) system or a Data Lake system.

In another exemplary embodiment, BMs may be incorporated within a suitable risk identification, assessment, and mitigation framework, such as that proposed by the ISO27001 model. It is also contemplated that BMs may be incorporated within an Identify-Assess-Recommend-Resolve (IAR) framework that utilizes different metrics to identify issues, then related metrics to assess the severity of the identified issue, followed by ranked and/or scored recommendations and finally coupled with a decision to execute such recommendation as part of a resolution plan. It is further contemplated that such a BM may further incorporate a Goal-Plan-Action (GPA) system with the IAR framework.

In another exemplary embodiment, a BM may be implemented within an Explanation and Interpretation Generation System (EIGS), allowing the EIGS to add behavioural modelling, prediction, monitoring, behavioural guarantees, and safety assurance to explainable and interpretable AI models and to Explanation Filter Interpretation (EFI) systems.

Exemplary embodiments of Behavioural Models may allow modern AI systems to reach a higher Evaluation Assurance Level (EAL) in the ISO/IEC 15408 standard and also within the context of the Common Criteria Recognition Arrangement (CCRA). AI systems based on black-box methods or similar architectures that do not allow for predictable and guaranteed behavior cannot achieve an EAL rating higher than EAL1 and possibly barely be acceptable for EAL2. BMs, especially in conjunction with explainable models, allow for straightforward certification at the EAL1 to EAL4 levels. The white-box nature of Behavioral Models, also allow certification at the higher and more difficult to achieve EAL5 to EAL7 levels, which is the highest level of verification and testing that can be achieved within practical quality assurance frameworks commonly in use world-wide. BM and explainable model-based AI system implementations can thus allow users to acquire a higher level of confidence that the system's principal security features are reliably implemented, by meeting specific assurance requirements. Typically, the functional features for each certified product or system are established in a Security Target document tailored for the EAL evaluation. Thus, a system's fitness for purpose for a particular security application depends on how well the features listed in the appropriate Security Target fulfill the application's actual security requirements. BMs and their associated explainable models can be analyzed and predicted using both semi-formal and formal methods, which is something that is out of scope for black-box systems. This inherent EAL related benefit for BMs allows hardware AI devices or related equivalent system to achieve successful EAL evaluations that are otherwise impossible to achieve. The EAL related benefits also apply to other similar contexts, such as the US FIPS 140-2, UK CESG Assisted Products Scheme (CAPS), the ISO/IEC 27001 standard and other applicable national and international standards and treaties.

An exemplary behavioral model framework may narrow the gap between the world as imagined 420 and the world as observed 450. The underlying explainability architecture of a behavioral model framework may explain the input dimensions of the explainable models using feature attribution and partitioning information and may provide multiple model explanations as output.

Ashmore et al. (2019) argued that the deployment model in an autonomous system should be adaptable in order to allow updates and changes to be made to the deployed model. Explanations can be attached to the respective actions, by utilizing conditional constraints, events, and triggers, to assure the safety of an autonomous or semi-autonomous system.

An exemplary embodiment may utilize BMs that take input from a combination of human knowledge injection (HKI) and system-knowledge injection to update the weights and coefficients of the underlying explainable architecture, to further increase the safety of the autonomous or semi-autonomous system. It is further contemplated that BM triggered actions may involve collaboration or a decision point involving one or more human users.

An exemplary embodiment may be fully compatible with all current deep learning libraries and architectures, allowing an embodiment to take advantage of all performance advancements available for deep learning systems. An embodiment may further allow for interpretable models to be trained prior to the deployment on an autonomous system and to be trained while the system is already deployed. An exemplary framework may allow for fusion of explainable models through partitioning and for understanding of the input features, through feature attributions and partitioning information, to the explainable models by utilizing underlying explainable architectures such as XNN or INN.

An alternative typical application of behavioral models is to integrate it with a combination of an Explainable Machine Learning System, Interpretable Machine Learning System, Explainer, Filter, Interpreter, Explanation Scaffolding, and Interpretation Scaffolding within the context of an Explanation and Interpretation Generation System (EIGS) and/or the Explanation-Filter-Interpretation (EFI) model.

In an exemplary embodiment, a BM may be used as the basis or part of a practical data privacy preserving AI system implementation. Data privacy may be violated intentionally or unintentionally by AI systems in a number of scenarios: (i.) personal data from training datasets unintentionally incorporated in AI models; (ii.) personal data can be re-extracted or re-created by analysing the model answers repeatedly; (iii.) personal data of certain uniquely identifiable groups may end up at a higher risk of identification; (iv.) model inversion and membership inference techniques, that can associate model data via a unique key or signature; (v.) other sources of information, such as public data sources, which may be combined with private information, may re-create or otherwise identify private information. The main data privacy preserving solutions for AI can be classified under four categories: (i.) differential privacy; (ii.) secure multi-party computation; (iii.) federated learning; (iv.) homomorphic encryption. Exemplary embodiments of BM systems may enable practical implementations under all four categories.

In an exemplary privacy preserving solution (i.), differential privacy, the introduction of noise in the training data or some other suitable means of obfuscation, may be used to generate a controllable amount of privacy through a noise factor or ratio, in the BM. The noise level may be a variable which the user may be able to supply or edit, where the noise level may be implemented as a constraint and/or objective. In privacy preserving solution (ii.), secure multi-party computation (SMPC) may be used to obtain a correct answer while concealing partial information about data and may simultaneously compute the answer using data from one or more sources. Exemplary embodiments of BMs and explainable models may extend SMPC protocols to apply to explanation generation apart from answer output. It is further contemplated that exemplary embodiments of BMs can be analyzed and tested formally for security and trust building purposes without revealing any private information. A secure enclave may also be used to decrypt the data in a protected space within the hardware processor, limiting the possibility that other parts of the system can access such data in clear text. An end-to-end hardware implementation of a BM system with a secure enclave may be rather resilient to most forms of data attacks. In privacy preserving solution (iii.), federated learning, a BM may be distributed across various decentralized devices that hold only local data samples. The local data samples are not shared with other devices, thus limiting, but not completely eliminating, the privacy risk involved, and may be particularly suitable for IoT or edge computing applications where messaging options are limited or constrained by the network topology, such as in a mesh network. In privacy preserving solution (iv.), homomorphic encryption, or homomorphic computing may be used to allow computation on encrypted data without either decrypting the data and, optionally, using encrypted explainable models. In an exemplary embodiment of a BM using homomorphically encrypted data and a homomorphically encrypted XNN, utilizing the CKKS protocol, a secret key and a public key are generated. The public key is used for encryption and can be shared, while the private key is used for decryption and must be kept secret, for example, in a secure hardware enclave or similar implementation solution.

An exemplary explainable behavioral framework may provide a practical safety solution for virtual reality (VR), augmented reality (AR) and metaverse applications, providing realistic safety boundaries of a physical nature where applicable, or by utilizing a psychologically derived human-behavior model to identify and assess potentially harmful situations for the environment's VR/AR/metaverse participants.

An exemplary explainable behavioral framework may provide a practical safety solution for machine learning models and tasks to be deployed in an autonomous system or semi-autonomous system to behave within certain conditional boundaries to avoid unexpected results. An exemplary behavioral framework may guarantee safety for the systems. Thus, safety assurance and safe control and operation of an autonomous or semi-autonomous system may be achieved without compromising the operational efficiency of the system.

The foregoing description and accompanying figures illustrate the principles, preferred embodiments, and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented behavioral modeling method for handling, modeling, predicting, and verifying a behavior of a system comprising at least one explainable model, comprising executing on a processor the steps of:

integrating at least one condition into at least one of a plurality of execution sequences in a behavioral modeling architecture, each condition based on one of an internal coefficient of the system or an environmental variable of the system, each condition configured to trigger at least one action if activated, and determining, for each of the plurality of execution sequences, a probability likelihood of encountering each of the plurality of execution sequences;

identifying at least one explanation corresponding to the at least one action in an action space, said explanation associated with at least one state and at least one reward, wherein at least one of the action space and the state space is discrete or continuous;

predicting and storing at least one predicted boundary associated with the at least one explainable model;

operating the system comprising the at least one explainable model, and continuously monitoring at least one variable including at least one of: one or more internal coefficients of the system in a system memory and one or more environmental variables in a physical space, wherein continuously monitoring comprises comparing the at least one variable to the at least one condition to determine whether the at least one condition has been met;

determining, based on monitoring the at least one condition, that the at least one condition has been met and that the at least one action paired with the at least one condition has been triggered;

determining an actual boundary demonstrated by triggering of the at least one condition, and, based on observation of the actual boundary, identifying a gap between the at least one predicted boundary of the at least one explainable model and the actual boundary;

updating the at least one predicted boundary of the at least one explainable model based on information observed during monitoring of the at least one condition and based on the gap identified between the at least one predicted boundary of the at least one explainable model and the actual boundary.

2. The method of claim 1, wherein the system comprises an observed behavioral model (OBM) comprising the at least one explainable model and further comprising a plurality of actual boundaries associated with the at least one explainable model, the plurality of actual boundaries including the actual boundary demonstrated by triggering of the at least one condition.

3. The method of claim 1, wherein the at least one explainable model comprises a non-deterministic behavioral model, said non-deterministic behavioral model comprising a ranked order of the plurality of activation sequences based on the probability likelihood of encountering each of the plurality of execution sequences.

4. The method of claim 1, wherein identifying the at least one explanation corresponding to the at least one action in the action space comprises identifying an associate explanation integrating an action and an explanation of the action.

5. The method of claim 1, wherein updating the at least one predefined predicted boundary comprises at least one of updating at least one coefficient defined within the at least one explainable model, or creating a rule or partition within an internal state of the at least one explainable model.

6. The method of claim 1, wherein the at least one explainable model comprises at least one of a prediction network and a conditional network; and wherein one or more constraints are provided on the at least one explainable model encompassing the at least one of the prediction network and the conditional network.

7. The method of claim 1, wherein the at least one explainable model includes a feature attribution network; and
wherein one or more constraints are provided on the explainable model encompassing the feature attribution network, said one or more constraints configured to monitor one or more feature attributions associated with an input dataset and compare the one or more feature attributions associated with the input dataset with one or more feature attributions associated with a predetermined dataset.

8. The method of claim 7, wherein the one or more constraints configured to monitor the one or more feature attributions associated with the input dataset are configured to provide an alert in a case where a difference between the one or more feature attributions associated with the input dataset and the one or more feature attributions associated with a predetermined dataset is above a predetermined level.

9. The method of claim 1, further comprising labeling one or more components within the at least one explainable model with one or more reference labels, wherein each reference label indicates an activation path leading to the labeled component.

10. The method of claim 9, wherein each reference label comprises one or more of: symbolic expressions provided in one of conjunctive normal form, disjunctive normal form, or first order logic; and
wherein the one or more reference labels include at least one link to an external taxonomy, ontology, or model.

11. The method of claim 9, further comprising outputting one or more explanations based on one or more reference labels, wherein the one or more reference labels comprise an interpretable path trace for one or more components associated with the reference labels.

12. The method of claim 1, wherein the system is a physical hardware device comprising one or more moving elements, and
wherein observation of the actual boundary comprises observation of a movement action executed by the one or more moving elements.

13. The method of claim 12, wherein the system further comprises one or more sensors linked to the physical hardware device, and wherein observation of the actual boundary comprises receiving and interpreting data from the one or more sensors.

14. The method of claim 1, further comprising converting an input of the system to a set of hidden features, identifying feature weights from the hidden features, combining the feature weights with the transformed input, and extracting an attribution of each hidden feature based on the combined feature weights and hidden features.

15. The method of claim 1, further comprising creating a plurality of partitions within the system, wherein each partition is associated with a label, a graph, a hypergraph, or a simplicial complex; and
associating a plurality of neuro-symbolic constraints with the partitions, wherein the neural-symbolic constraints associated with the partitions comprise one or more of: symbolic rules or a system of symbolic expressions, polynomial expressions, conditional and non-conditional probability distributions, joint probability distributions, state-space and phase-space transforms, integer/real/complex/quaternion/octonion transforms, Fourier transforms, Walsh functions, Haar and non-Haar wavelets, generalized L2 functions, fractal-based transforms, Hadamard transforms, Type 1 and Type 2 fuzzy logic, topological transforms of Kolmogorov/Frechet/Hausdorff/Tychonoff spaces, and difference analysis.

16. The method of claim 15, wherein each partition comprises a local model with one or more rules, and the partitions are aggregated to form a global model.

17. The method of claim 1, wherein the behavioral modeling architecture is implemented on one or more Finite State Machines, Petri Nets, Robotic Process Automation (RPA) systems, Actor Models, workflow systems, or quantum processing systems.

18. The method of claim 1, further comprising:
providing a causal model separate from the at least one explainable model, said at least one causal model configured to implement causal logic and at least one of deductive logic, abductive logic, and inductive logic; and
triggering at least one of an event or an action based on an output of the causal model.

19. A system comprising a processor and a memory and configured to implement at least one explainable model, wherein the system is configured to execute, on the processor, steps of:
integrating at least one condition into at least one of a plurality of execution sequences in a behavioral modeling architecture, each condition based on one of an internal coefficient of the system or an environmental variable of the system, each condition configured to trigger at least one action if activated, and determining, for each of the plurality of execution sequences, a probability likelihood of encountering each of the plurality of execution sequences;
identifying at least one explanation corresponding to the at least one action in an action space, said explanation associated with at least one state and at least one reward, wherein at least one of the action space and the state space is discrete or continuous;
predicting and storing at least one predicted boundary associated with the at least one explainable model;
operating the system comprising the at least one explainable model, and continuously monitoring at least one variable including at least one of: one or more internal coefficients of the system in a system memory and one or more environmental variables in a physical space, wherein continuously monitoring comprises comparing the at least one variable to the at least one condition to determine whether the at least one condition has been met;
monitoring the at least one condition, and determining that the at least one condition has been met and that the at least one action paired with the at least one condition has been triggered;
observing an actual boundary demonstrated by triggering of the at least one condition, and, based on observation of the actual boundary, identifying a gap between the at least one predicted boundary of the at least one explainable model and the actual boundary;
updating the at least one predicted boundary of the at least one explainable model based on information observed during monitoring of the at least one condition and based on the gap identified between the at least one predefined-boundary of the at least one explainable model and the actual boundary.

20. A non-transitory computer-readable medium comprising program code that, when executed by a processor of a system configured to provide at least one explainable model, is configured to cause the processor to execute steps of:

integrating at least one condition into at least one of a plurality of execution sequences in a behavioral modeling architecture, each condition based on one of an internal coefficient of the system or an environmental variable of the system, each condition configured to trigger at least one action if activated, and determining, for each of the plurality of execution sequences, a probability likelihood of encountering each of the plurality of execution sequences;

identifying at least one explanation corresponding to the at least one action in an action space, said explanation associated with at least one state and at least one reward, wherein at least one of the action space and the state space is discrete or continuous;

predicting and storing at least one predicted boundary associated with the at least one explainable model;

operating the system comprising the at least one explainable model, and continuously monitoring at least one variable including at least one of: one or more internal coefficients of the system in a system memory and one or more environmental variables in a physical space, wherein continuously monitoring comprises comparing the at least one variable to the at least one condition to determine whether the at least one condition has been met;

monitoring the at least one condition, and determining that the at least one condition has been met and that the at least one action paired with the at least one condition has been triggered;

observing an actual boundary demonstrated by triggering of the at least one condition, and, based on observation of the actual boundary, identifying a gap between the at least one predicted boundary of the at least one explainable model and the actual boundary;

updating the at least one predicted boundary of the at least one explainable model based on information observed during monitoring of the at least one condition and based on the gap identified between the at least one predicted predefined boundary of the at least one explainable model and the actual boundary.

* * * * *